United States Patent
Watanabe

(10) Patent No.: US 7,516,335 B2
(45) Date of Patent: Apr. 7, 2009

(54) NETWORK CONTROL DEVICE FOR AN IMAGE FORMING APPARATUS THAT ENABLES A NETWORK FILTER DURING A GRACE TIME BEFORE ENTERING AN ENERGY SAVING MODE

(75) Inventor: Hideyuki Watanabe, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 474 days.

(21) Appl. No.: 11/081,774

(22) Filed: Mar. 17, 2005

(65) Prior Publication Data

US 2005/0216776 A1  Sep. 29, 2005

(30) Foreign Application Priority Data

Mar. 17, 2004   (JP)   ............... 2004-076989

(51) Int. Cl.
- *G06F 1/00* (2006.01)
- *G06F 1/26* (2006.01)
- *G06F 1/32* (2006.01)

(52) U.S. Cl. .................. 713/300; 713/320; 713/323

(58) Field of Classification Search .......... 713/300, 713/320, 323

See application file for complete search history.

(56) References Cited

U.S. PATENT DOCUMENTS

| | | | | |
|---|---|---|---|---|
| 6,292,831 B1 * | 9/2001 | Cheng | .................. | 709/224 |
| 6,311,276 B1 * | 10/2001 | Connery et al. | .................. | 726/2 |
| 6,366,957 B1 * | 4/2002 | Na | .................. | 709/229 |
| 6,591,368 B1 * | 7/2003 | Ryu | .................. | 713/323 |
| 6,760,850 B1 * | 7/2004 | Atkinson et al. | .................. | 713/320 |
| 6,807,907 B2 * | 10/2004 | Yamada | .................. | 101/484 |
| 7,107,318 B2 * | 9/2006 | Brown et al. | .................. | 709/208 |
| 7,107,442 B2 * | 9/2006 | Cheshire | .................. | 713/1 |
| 7,251,736 B2 * | 7/2007 | Dayan et al. | .................. | 713/310 |
| 2002/0157030 A1 * | 10/2002 | Barker et al. | .................. | 713/320 |
| 2002/0162038 A1 * | 10/2002 | Bullman et al. | .................. | 713/323 |
| 2003/0179725 A1 * | 9/2003 | Lo et al. | .................. | 370/328 |
| 2005/0128515 A1 * | 6/2005 | Ohno | .................. | 358/1.15 |

FOREIGN PATENT DOCUMENTS

| | | |
|---|---|---|
| JP | 11-85420 | 3/1999 |
| JP | 2001-075687 | 3/2000 |

(Continued)

OTHER PUBLICATIONS

Advance Micro Devices, "Magic Packet Technology White Paper", Nov. 1995, retrived from http://www.amd.com/us-en/assets/content_type/white_papers_and_tech_docs/20213.pdf.*

*Primary Examiner*—Thomas Lee
*Assistant Examiner*—Ji H Bae
(74) *Attorney, Agent, or Firm*—Oblon, Spivak, McClelland, Maier & Neustadt, P.C.

(57) ABSTRACT

A main Central Processing Unit (CPU) controls enabling and disabling a function of a network filter, and disables a function of a packet type filter (Transmission Control Protocol (TCP) header filter) during a ready status after a system is powered on. The packet type filter whether a predetermined flag corresponds to a flag included in a TCP header of an Internet Protocol (IP) packet received through a network. The main CPU enables the function in an energy-saving mode, and disables the function when the energy-saving mode transitions to the ready status.

24 Claims, 17 Drawing Sheets

FOREIGN PATENT DOCUMENTS

| | | |
|---|---|---|
| JP | 2002-99399 | 4/2002 |
| JP | 2003-283588 | 10/2003 |
| JP | 2003-283748 | 10/2003 |
| JP | 2004-112718 | 4/2004 |
| JP | 2004-153738 | 5/2004 |
| JP | 2004-153742 | 5/2004 |
| JP | 2004-222234 | 8/2004 |
| JP | 2004-243533 | 9/2004 |

* cited by examiner

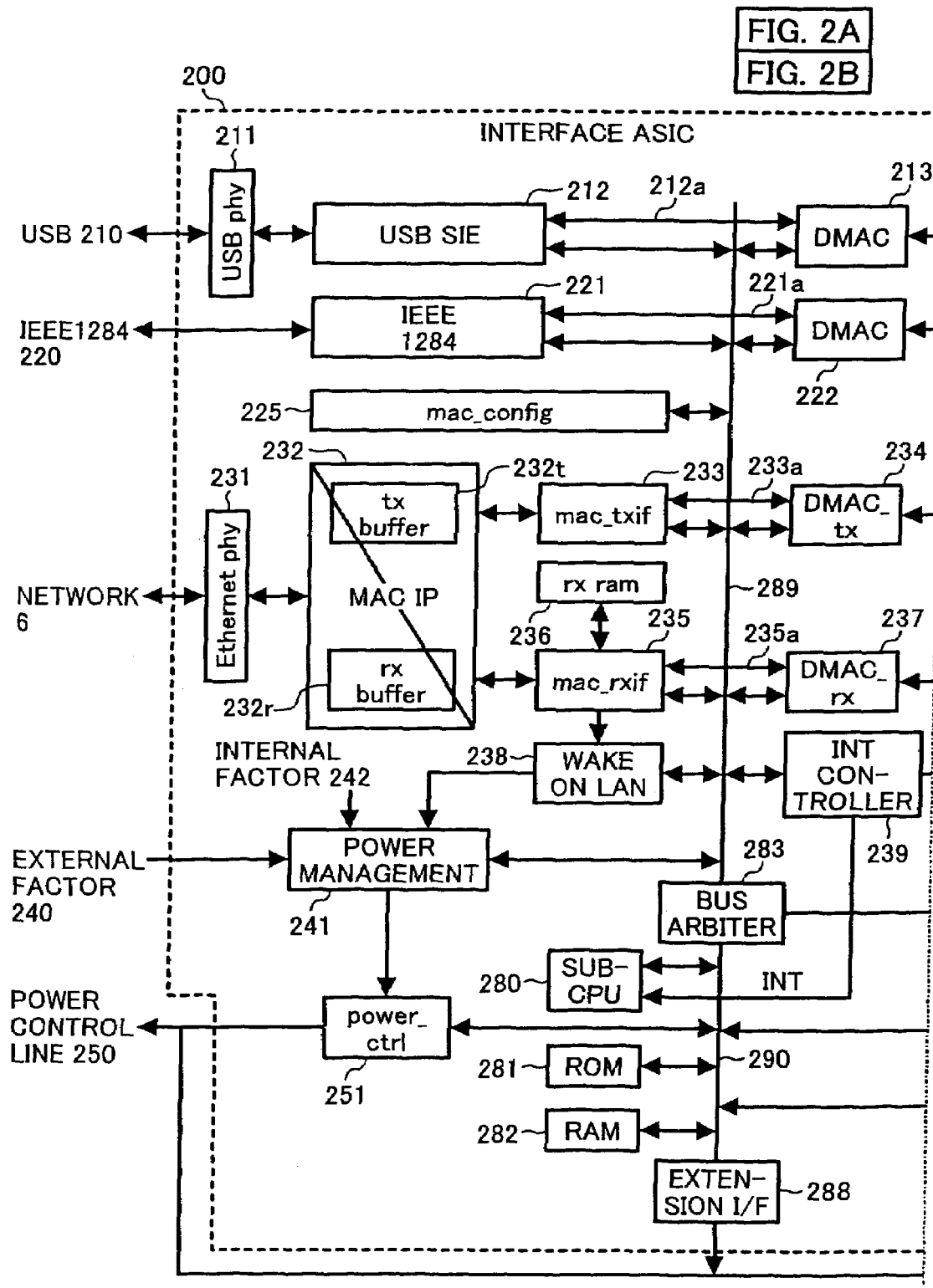

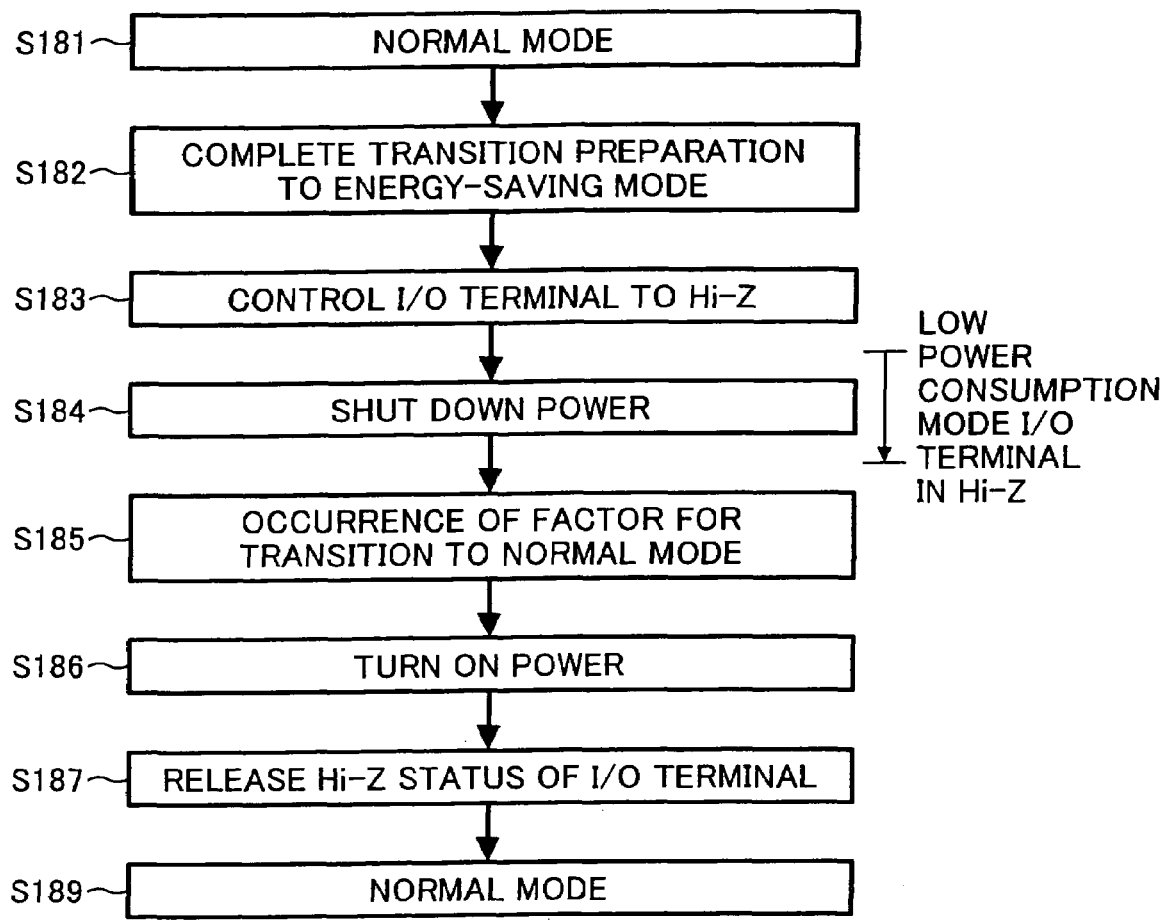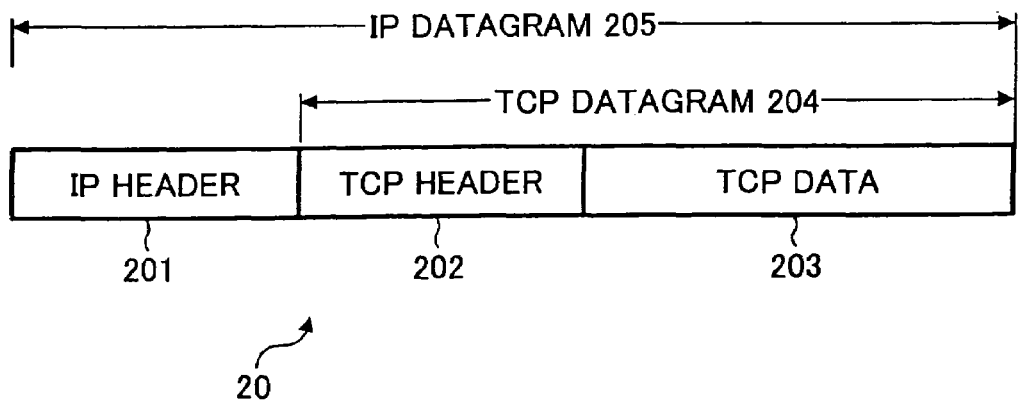

NETWORK CONTROL DEVICE FOR AN IMAGE FORMING APPARATUS THAT ENABLES A NETWORK FILTER DURING A GRACE TIME BEFORE ENTERING AN ENERGY SAVING MODE

CROSS-REFERENCE TO RELATED APPLICATIONS

The present document incorporates by reference the entire contents of Japanese priority document, 2004-076989 filed in Japan on Mar. 17, 2004.

BACKGROUND OF THE INVENTION

1) Field of the Invention

The present invention relates to a technology for saving energy of a network interface. More particularly, the present invention relates to a network control device and a network control method that control energy saving, an image forming apparatus that includes the network control device, an image forming system that includes the image forming apparatus, and a computer product.

2) Description of the Related Art

Japanese Patent Application Laid-Open No. H11-085420 discloses a printing system for energy saving. In the printing system, a host device and a printer are connected to each other through a network. The printer receives print data transmitted from the host device and prints it out. In the invention, when the printer enters the energy-saving mode, the printer notifies the host device of entering the energy-saving mode. On the other hand, when a button for releasing energy saving is depressed on the host device, the host device transmits data for releasing energy saving to the printer, and the energy-saving mode is released. Disadvantageously, this printing system requires an application for controlling energy saving in the host side.

Japanese Patent Application Laid-Open No. 2002-111927 discloses a facsimile device for energy saving. The facsimile device includes a facsimile communication unit, which performs facsimile communication through at least a public line, and a Local Area Network (LAN) interface (I/F). In the facsimile device, the LAN I/F includes a controller that switches a mode of the facsimile between a normal operation mode, where a program operates at an ordinary clock frequency, and a low-power mode (energy-saving mode), where the clock stops. In the facsimile device, when the LAN I/F receives a seizure signal through the LAN, the facsimile device transits from the energy-saving mode to the normal mode. However, since the seizure signal is set to an IP address of the facsimile device itself, when receiving a packet for the facsimile device, the mode always returns to the normal mode no matter what the packet is. Therefore, the energy saving effect is practically low.

SUMMARY OF THE INVENTION

It is an object of the present invention to solve at least the problems in the conventional technology.

According to one aspect of the present invention, a network control device sets a normal mode and an energy-saving mode in a system. The system includes a controller that includes a main Central Processing Unit (CPU); and an interface controller that includes the network control device and a sub CPU, and is connected to a network, wherein both the controller and the interface controller operate in the normal mode, and power to the controller is shut down in the energy-saving mode. The network control device includes a network filter that, when the system receives a packet transferred through the network, determines whether data included in the packet corresponds to predetermined data based on an attribute of the data; and a control unit that enables and disables a function of the network filter. In the network control device, the control unit disables the function when the system is in the normal mode after the system is powered on, enables the function when the system is in the energy-saving mode, and disables the function when the system transits from the energy-saving mode to the normal mode.

According to another aspect of the present invention, an image forming apparatus includes the network control device described above and an imaging unit that forms an image on a recording medium based on data inputted to the image forming apparatus.

According to still another aspect of the present invention, an image forming system includes the image forming apparatus described above and a plurality of client computers. In the image forming system, the image forming apparatus and the client computers are connected through a network, and the image forming apparatus operates according to an instruction from one of the client computers so as to form an image.

According to still another aspect of the present invention, a network control method that sets a normal mode and an energy-saving mode in a system. The system includes a controller that includes a main Central Processing Unit (CPU); and an interface controller that includes the network control device and a sub CPU, and is connected to a network. In the system, both the controller and the interface controller operate in the normal mode, and power to the controller is shut down in the energy-saving mode. The network control method includes disabling a function for determination when the system is in the normal mode; and enabling the function when the system transits from the normal mode to the energy-saving mode. In the network control method, when the system receives a packet transferred through the network, it is determined in the determination whether data included in the packet corresponds to predetermined data based on an attribute of the data.

According to still another aspect of the present invention, the network control method described above is executed by a computer program.

According to still another aspect of the present invention, a recording medium stores therein the computer program described above.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 is a diagram of operation statuses and process timings of the main CPU and the sub CPU at power-on;

FIG. 12 is a flowchart of a process procedure upon transition from the normal mode to the energy-saving mode and transition from the energy-saving mode to the normal mode;

FIG. 13 is a diagram of an IP packet that is filtered by a packet type filter;

DETAILED DESCRIPTION

Exemplary embodiments of the present invention are explained in detail below with reference to the accompanying drawings.

Figure 1:
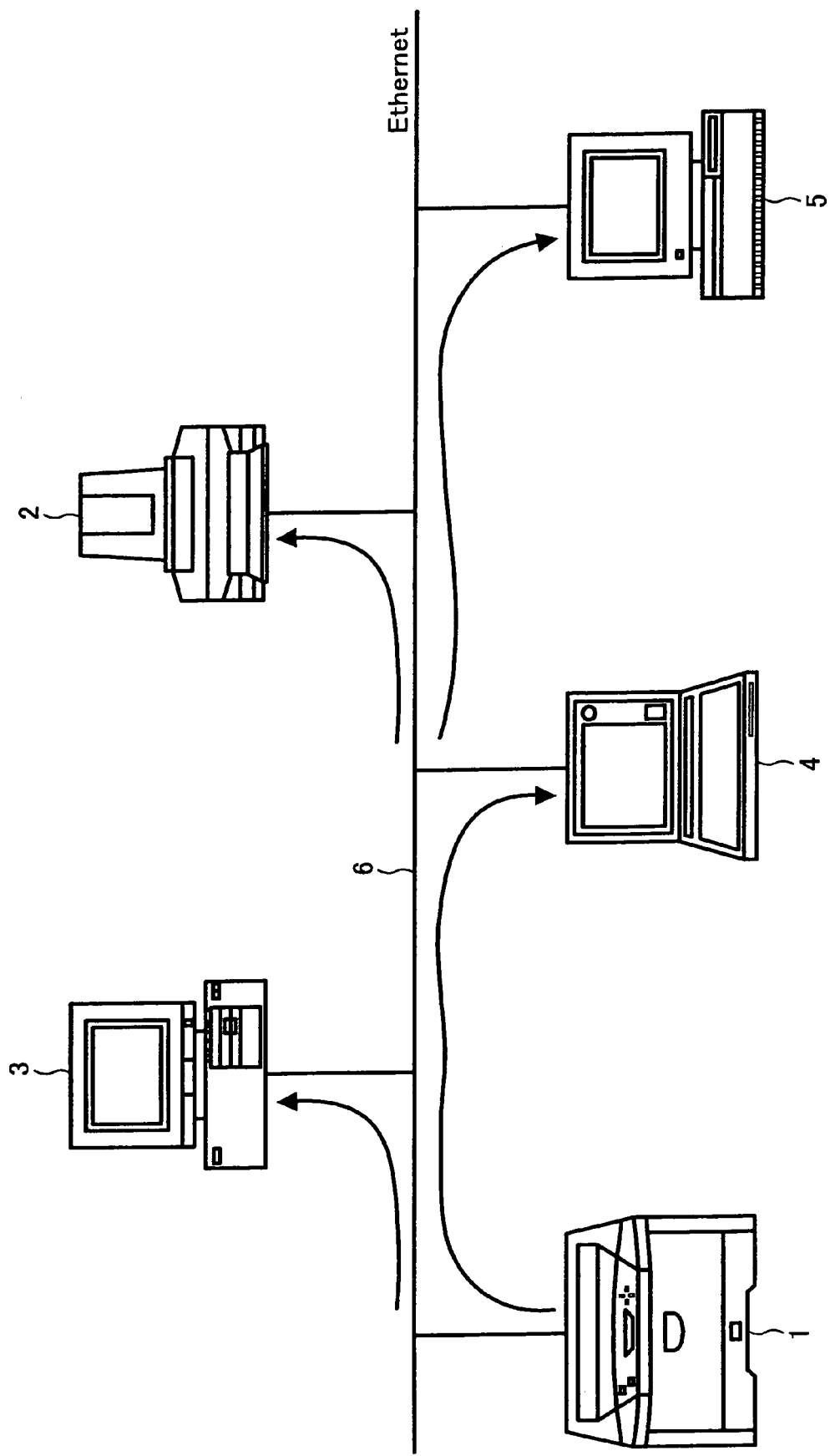
FIG. 1 is a diagram of a network system according to an embodiment of the present invention.

FIG. 1 is a diagram of a network system according to an embodiment of the present invention. The network system includes an image forming apparatus (MFP) 1 having a multifunction such as a copier and a printer, a printer 2, and personal computers (PCs) 3, 4, and 5 that use the image forming apparatus 1 or the printer 2, which are connected to a network 6. The number of the MFP 1, the printer 2, the PCs 3, 4, and 5 that are connected to the network 6 is one of examples. Therefore, a large scaled system in which a larger number of these devices are connected thereto and a small scaled system in which a smaller number of these devices are connected thereto may be realized in the same manner as explained above. In the example, a print instruction is sent from any one of the PCs 3, 4, and 5 to the MFP 1 or the printer 2 to enable printing. It is noted that Ethernet™ is used for the network 6 in the embodiment.

The image forming-apparatus 1 and the printer 2 include an electrophotographic or ink-jet type imaging unit having a known configuration. Since this type of image forming apparatus and printer is well known, details of a mechanical configuration and an electrical configuration thereof are omitted.

Figure 2B:
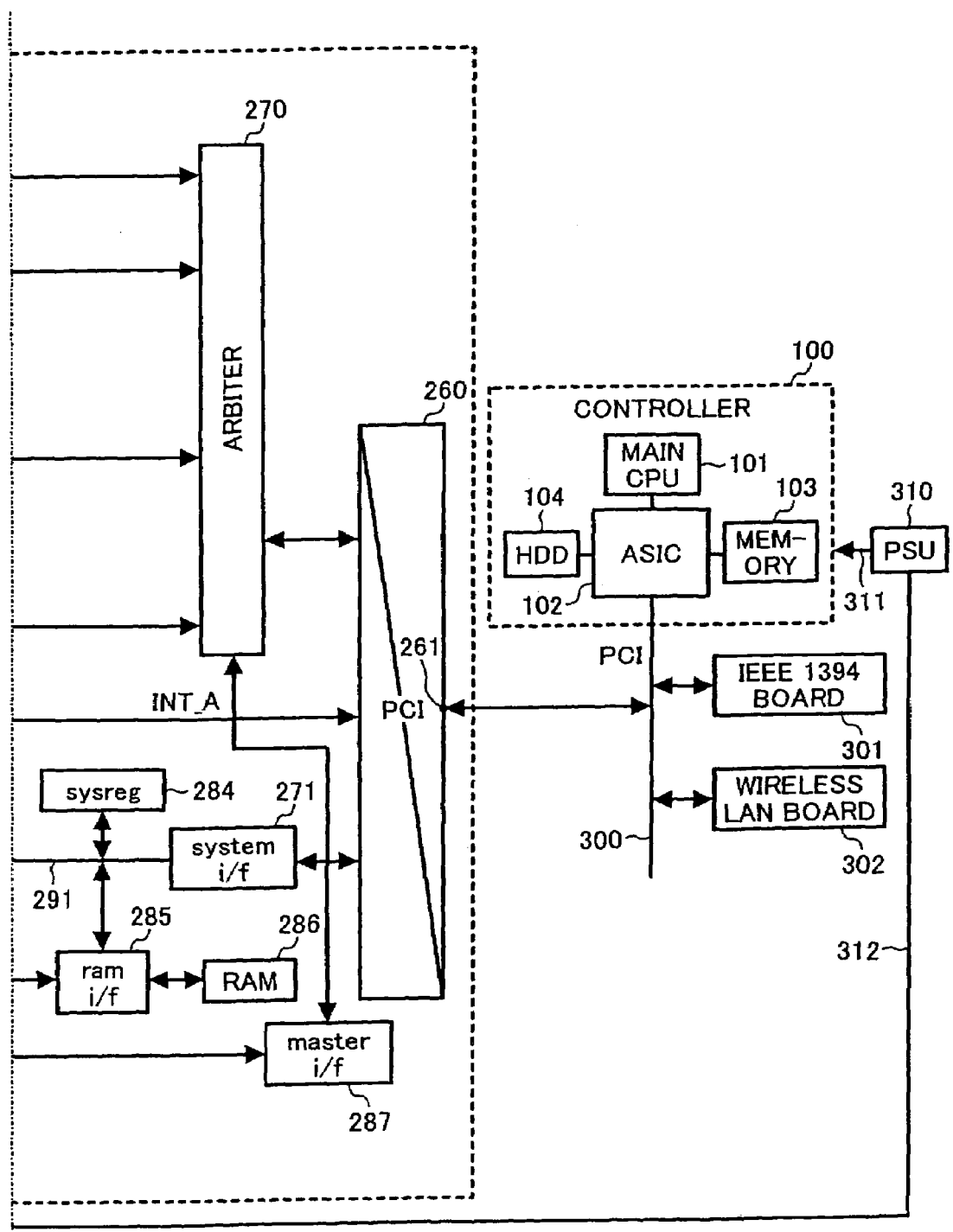
FIG. 2 is a block diagram of a control unit of an image forming apparatus according to the embodiment.
Figure 3:
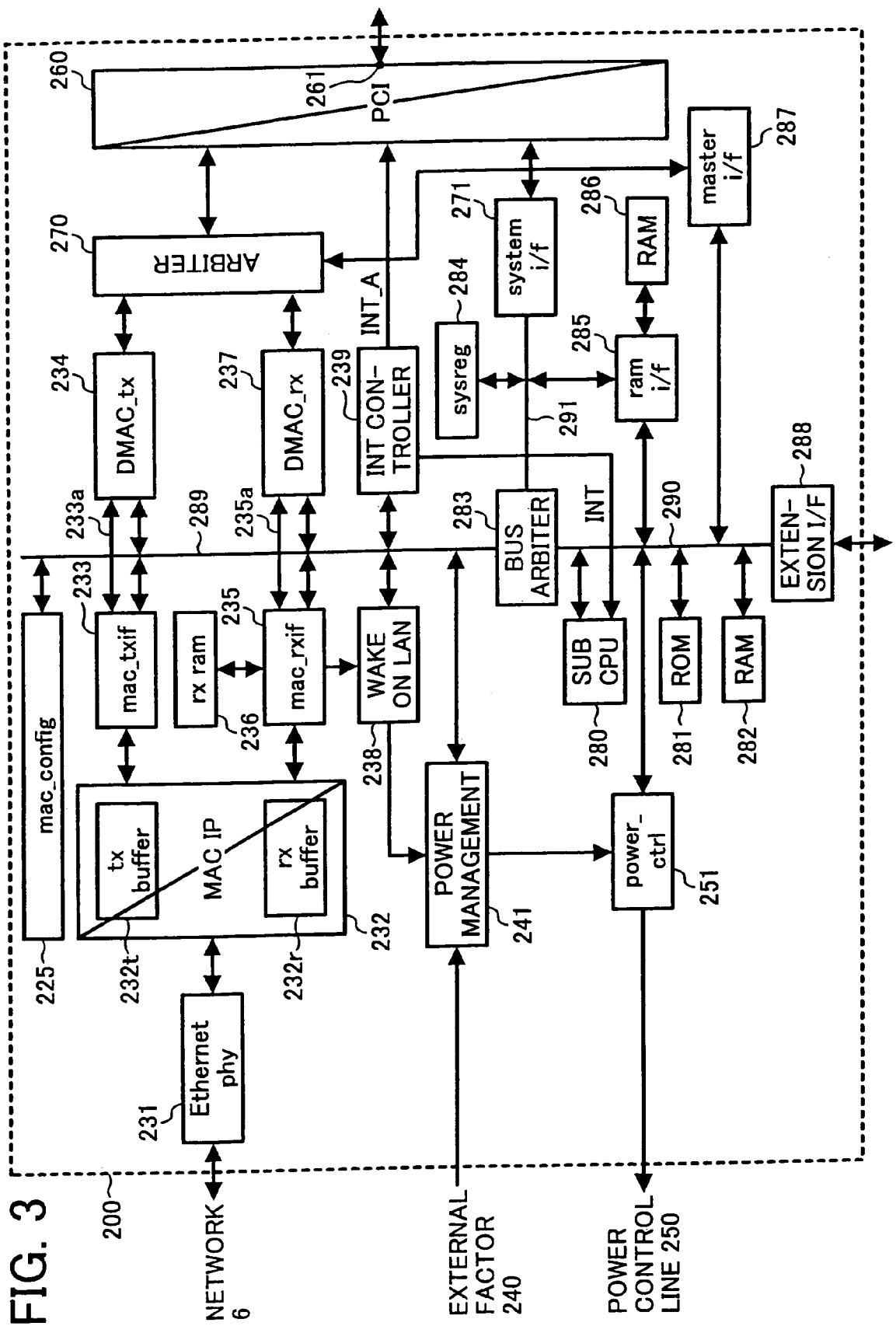
FIG. 3 is a block diagram of a main portion of the control unit of FIG. 2.

FIG. 2 is a block diagram of a control unit of an image forming apparatus according to the embodiment of the present invention. FIG. 3 is a block diagram of a main portion of the control unit. The control unit includes a controller 100, an interface (interface ASIC) 200, and a Peripheral Component Interconnect (PCI) bus 300 that connects the two.

The controller 100 includes a main Central Processing Unit (CPU) 101, an Application Specific Integrated Circuit (ASIC) 102, and a memory 103 and a Hard Disk Drive (HDD) 104 that store image data sent through a network. The main CPU 101, the memory 103, and the HDD 104 are connected to the ASIC 102, and the ASIC 102 is connected to the PCI bus 300. The main CPU 101 controls the image forming apparatus (not shown), and the ASIC 102 controls input and output of data to and from the main CPU 101, the memory 103, and the HDD 104.

An IEEE 1394 board 301, a wireless LAN board 302, and the interface ASIC 200 are connected to the PCI bus 300.

The interface ASIC 200 is connected to a Universal Serial Bus (USB) 210, IEEE 1284 220, the network 6, an input for external factor 240, and a power control line 250. The power control line 250 is connected to a power supply circuit (unit) (PSU) 310. Power is supplied from the power supply circuit 310 to the controller 100 through a power supply line 311 and further to the main CPU 101 according to an instruction output through the power control line 250.

The controller 100 is connected to the interface ASIC 200 through the PCI bus 300 and PCI 260, i.e., an input-output (I/O) terminal 261 of the PCI 260. The PCI 260 is connected to an arbiter 270 and a system interface (system i/f) 271, which are components of the interface ASIC 200. Hereinafter, the interface may be referred to as "I/F" or "if".

The USB 210 is connected with a USB physical layer (USB phy) 211, USB SIE 212, and a Direct Memory Access Controller (DMAC) 213, and the DMAC 213 is connected to the arbiter 270.

An IEEE 1284 connection line is connected with an IEEE 1284 221 and a DMAC 222, and the DMAC 222 is further connected to the arbiter 270.

The network 6 is connected with an Ethernet™ physical layer (Ethernet Phy) 231 and a Media Access Control Internet Protocol (MAC IP) 232. The MAC IP 232 includes a tx buffer 232$t$ and an rx buffer 232$r$. The tx buffer 232$t$ and the rx buffer 232$r$ are connected to mac_txif 233 and mac_rxif 235, respectively, which are connected to DMAC_tx 234 and DMAC_rx 237, respectively. The DMAC_tx 234 and the DMAC_rx 237 are further connected to the arbiter 270. It is noted that signs 212$a$, 221$a$, 233$a$, and 235$a$ represent a bus switching circuit, and mac_config 225 performs setting of the MAC_IP 231, the mac_txif 233, and the mac_rxif 235.

The mac_rxif 235 is also connected with rx RAM (rx ram) 236 and Wake On LAN (WON) 238, and the Wake On LAN 238 is connected to an interrupt controller (INT Controller) 239 through a power management unit (Power Management) 241 and a bus (packet transfer bus or CPU bus) 289. The power management unit 241 receives an external factor 240 and an internal factor 242, and outputs a control signal to a power controller (power_ctl) 251. The Wake On LAN 238 includes a pattern filter. If the energy-saving mode is on as explained later and if a particular pattern is contained in a packet received, the power management unit 241 instructs the power controller 251 to turn on the power to the main CPU 101 (controller 100).

The power management unit 241 is connected to the bus 289. The power controller 251, a sub CPU 280, a read only memory (ROM) 281, a random access memory (RAM) 282, RAM 286, and a master interface (master i/f) 287 are also connected to the bus 289. The RAM 286 is connected to a bus 290 and a bus 291 through an RAM i/f (ram i/f) 285. The master i/f 287 is also connected to the arbiter 270. The arbiter 270 arbitrates each connection status of the DMAC 213, the DMAC 222, DMAC_tx 234, DMAC_rx 237 according to a signal from the master i/f 287. The bus 289, the bus 290, and the bus 291 are also connected to a bus arbiter 283. The bus arbiter 283 arbitrates the use of the bus 289, the bus 290, and the bus 291. The bus 291 is connected with a system register (sysreg) 284, and the bus 290 is connected with an extension i/f (or packet transfer bus) 288. The system register 284 stores version information for the interface ASIC 200 in this embodiment. Therefore, the version information stored is used for identification of a version-up or a bug that is found in the interface ASIC 200.

The sub CPU 280 controls on-off of the power to the main CPU 101 in the energy-saving mode. If the process can be performed without use of the main CPU 101 in the energy-saving mode, then the sub CPU 280 executes the process without using it. Conversely, in the normal mode in which the main CPU 101 operates, the sub CPU 280 is set to an energy-saving status (low power consumption status).

Figure 4:
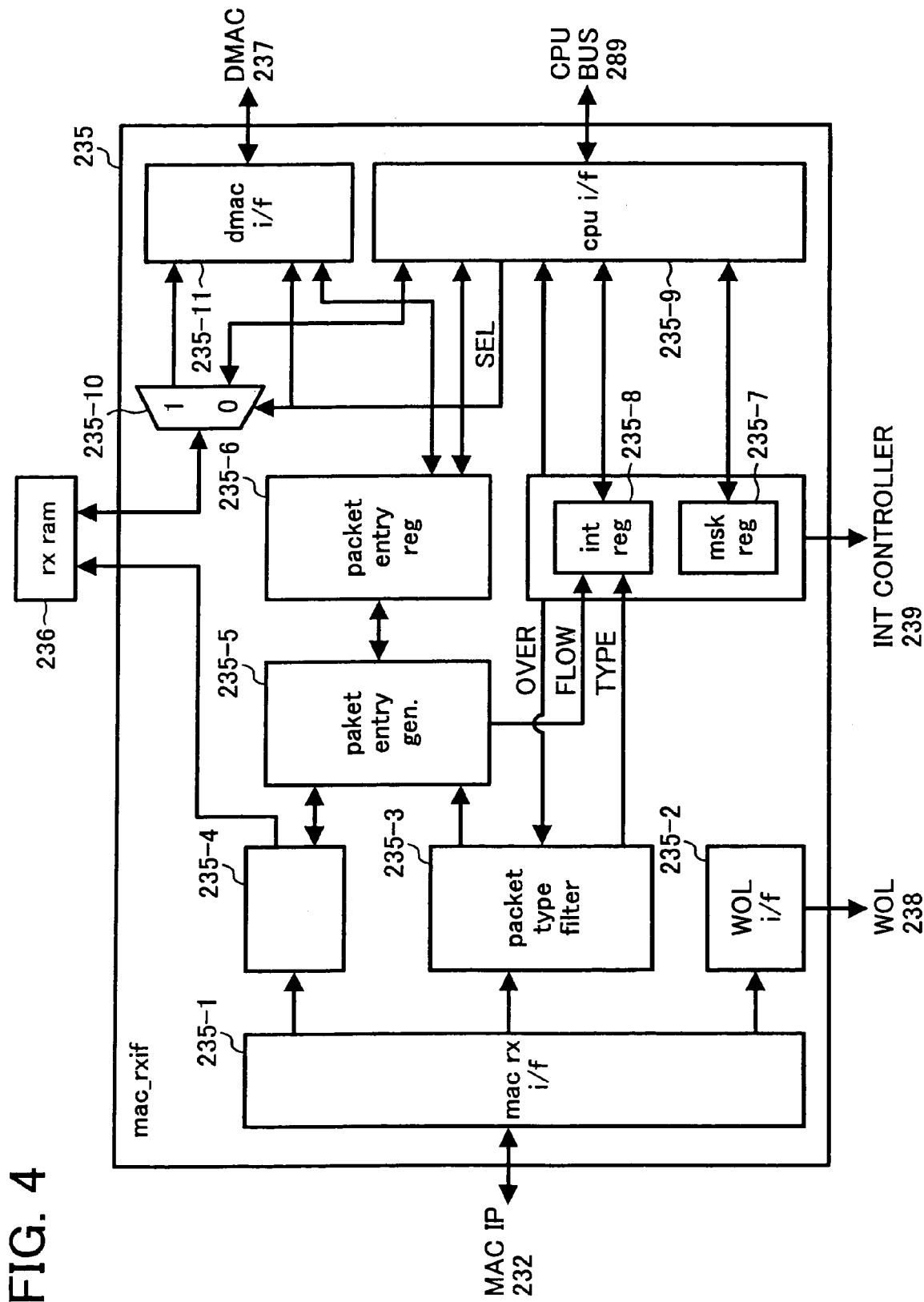
FIG. 4 is a block diagram of a mac_rxif of FIG. 2 and FIG. 3.

FIG. 4 is a block diagram of the mac_rxif 235. The mac_rxif 235 includes a mac rx i/f 235-1 that functions as an interface with the MAC IP 232, a WOL i/f 235-2 that functions as an interface with the Wake On LAN 238, a packet type filter (which is the same as a Transmission Control Protocol (TCP) header filter) 235-3, an rx buffer interface (rx buffer i/f) 235-4 that functions as an interface with the rx buffer 232*r*, a packet entry generator (packet entry gen.) 235-5, a packet entry register (packet entry reg) 235-6, a mask register (msk reg) 235-7, an interrupt register (int reg) 235-8, a cpu i/f 235-9, a selector 235-10, and a dmac i/f 235-11.

Based on such a configuration, when data is transmitted through network 6, and inputted from the MAC IP 232, the data is inputted to the WOL i/f 235-2, the packet type filter 235-3, and the rx buffer interface 235-4. The data (information) is further inputted from the WOL i/f 235-2 to the WOL 238, from the packet type filter 235-3 to the interrupt register (int reg) 235-8 and the packet entry generator 235-5, and from the rx buffer interface 235-4 to the rx RAM 236, respectively. The information from the rx RAM 236 is inputted to the dmac i/f 235-11 or the cpu i/f 235-9 through operation of the selector 235-10 based on an instruction from the sub CPU 280.

The packet type filter 235-3 selects only a packet in which preset information is written in the energy-saving mode, and notifies the packet entry generator 235-5 of whether a packet is to be selected. The packet entry generator 235-5 instructs the rx buffer interface 235-4 to store information in the rx RAM 236 based on the notification, and only the information selected by the packet type filter 235-3 is stored in the rx RAM 236. The information stored is processed by the sub CPU 280, which is explained later.

Figure 5:
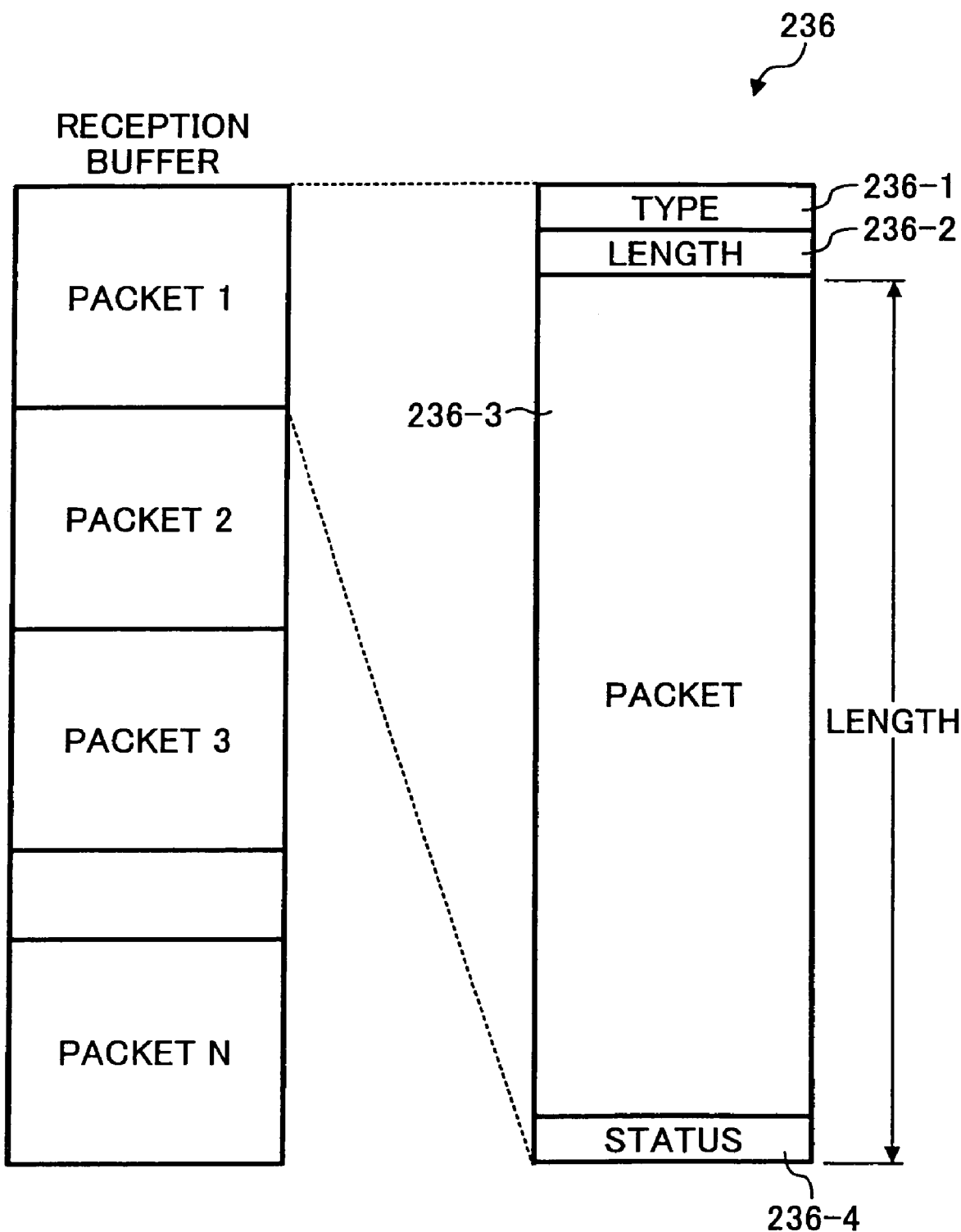
FIG. 5 is a diagram for explaining a structure of an rx RAM.

FIG. 5 is a memory map of the rx RAM 236. The rx RAM 236 includes TYPE 236-1, LENGTH 236-2, Packet 236-3, and Status 236-4. The TYPE 236-1 stores numbers of a packet filter and a pattern filter, and the number indicates which filter receives a packet. The LENGTH 236-2 indicates a length of a packet received, and the Packet 236-3 stores the contents of the packet received (contents of Packet 1 in this case). The Status 236-4 stores information for the packet received, i.e., packet information sent from the MAC IP 232.

The packet entry register 235-6 includes a function of address management for entering information in which a correlation between a, packet and a corresponding address in the rx RAM 236 is written, and stores a header address of a packet N received by the rx RAM 236. In the normal mode, since the packet type filter 235-3 does not function, all pieces of information are stored once in the rx RAM 236, sent from the dmac i/f 235-11 to the controller 100 through the DMAC_rx 237, and are processed in the main CPU 101.

An interrupt signal is outputted from a register (int reg 235-8, and msk reg 235-7), and is sent to the interrupt controller (INT Controller) 239, where a predetermined interrupt is performed. The mask register 235-7 outputs a mask signal for masking an input terminal of the interface ASIC 200 so as not to be externally affected.

In the control unit configured in the above manner, the main CPU 101 receives print data through a network in the normal mode, and the ASIC 102 writes it in the memory 103 and then sends it to a print engine where it is .printed. At this time, the sub CPU 280 is set to the low power consumption mode, so that the sub CPU 280 is in a status of operation requiring only minimum power consumption. In this embodiment, referring to the sub CPU 280, the power is not turned off but clock is set to zero (clock is stopped) so that the sub CPU 280 does not operate.

In this status, the print data is inputted from the network 6 via the Ethernet™ physical layer 231, and transferred to the memory 103 via the rx buffer 232*r* of the MAC IP 232, the mac_rxif 235, the DMAC_rx 237, the arbiter 270, the PCI 260, the PCI bus 300, and the ASIC 102. The print data inputted is stored in the memory 163. Conversely, if the data stored in the memory 103 or the HDD 104 is transmitted to another device, the data is sent to the network 6 via the ASIC 102, the PCI bus 300, the PCI 260, the arbiter 270, the DMAC_tx 234, the mac_txif 233, the tx buffer 232*t* of the MAC IP 232, and the Ethernet™ physical layer 231. It is noted that the data inputted to the mac_rxif 235 is stored once in the rx RAM 236 in this normal operation status, is extracted in the order from the data first stored, and is outputted from the mac_rxif 235 to the DMAC_rx 237.

Data transmission/reception is performed between the USB 210 and the controller 100 is performed, through the USB physical layer 211, the USB SIE 212, the DMAC 213, the arbiter 270 and the PCI 260. Data transmission/reception is performed between the IEEE 1284 (220) and the controller 100, through the DMAC 222, the arbiter 270, and the PCI 260.

At this time, the sub CPU 280, the ROM 281 that stores the programs of the sub CPU 280, and the RAM 282 that functions as a work area for the sub CPU 280 are set to the low power consumption status.

A mode transits from the normal mode to the energy-saving mode when data is not inputted from the outside to the control unit for a fixed time or when it is instructed from the control unit of the image forming apparatus (not shown) or a PC (any one of the PCs 3, 4, and 5 of FIG. 1) connected to the network 6. In the energy-saving mode, power is not supplied to the controller 100 including the main CPU 101. In other words, energization is not performed from the power supply circuit 310 that supplies power to the controller 100. The energization is controlled by the power controller 251 through the power control line 250, and the power controller 251 controls on-off of energization to the controller 100 based on an instruction from the power management unit 241 or an instruction from the sub CPU 280.

Transition from the normal mode to the energy-saving mode and transition from the energy-saving mode to the normal mode are explained later. Because the drive power is not supplied to the controller 100 including the main CPU 101 in the energy-saving mode, the main CPU 101 does not operate, and therefore, the memory 103 and the HDD 104 cannot be used. In this status, portions related to the network 6, the external factor 240, and the power control line 250 are energized, but portions related to the USB SIE 212 and the IEEE 1284 221 are not energized.

When the energy-saving mode is on, power supply to the controller 100 is cut, and the sub CPU 280 controls communications with the network 6. If data inputted through the network 6 can be processed by the sub CPU 280, the energy-saving mode is continued as it is. However, if print data is inputted through the network 6, it cannot be processed by the sub CPU 280. Therefore, energization to the controller 100 starts and the mode transits from the energy-saving mode to the normal mode.

In the energy-saving mode, a packet input from the network 6 to the image forming apparatus 1 is subjected to filtering in the packet type filter (TCP Header Filter) 235-3 of the mac_rxif 235. In other words, of packets inputted, a packet in which preset information is written is selected by the packet type filter 235-3, and the packet selected is stored in the rx RAM 236. However, a packet in which the preset information is not written is overwritten, and therefore, practically, this packet is not stored therein.

Figure 6:
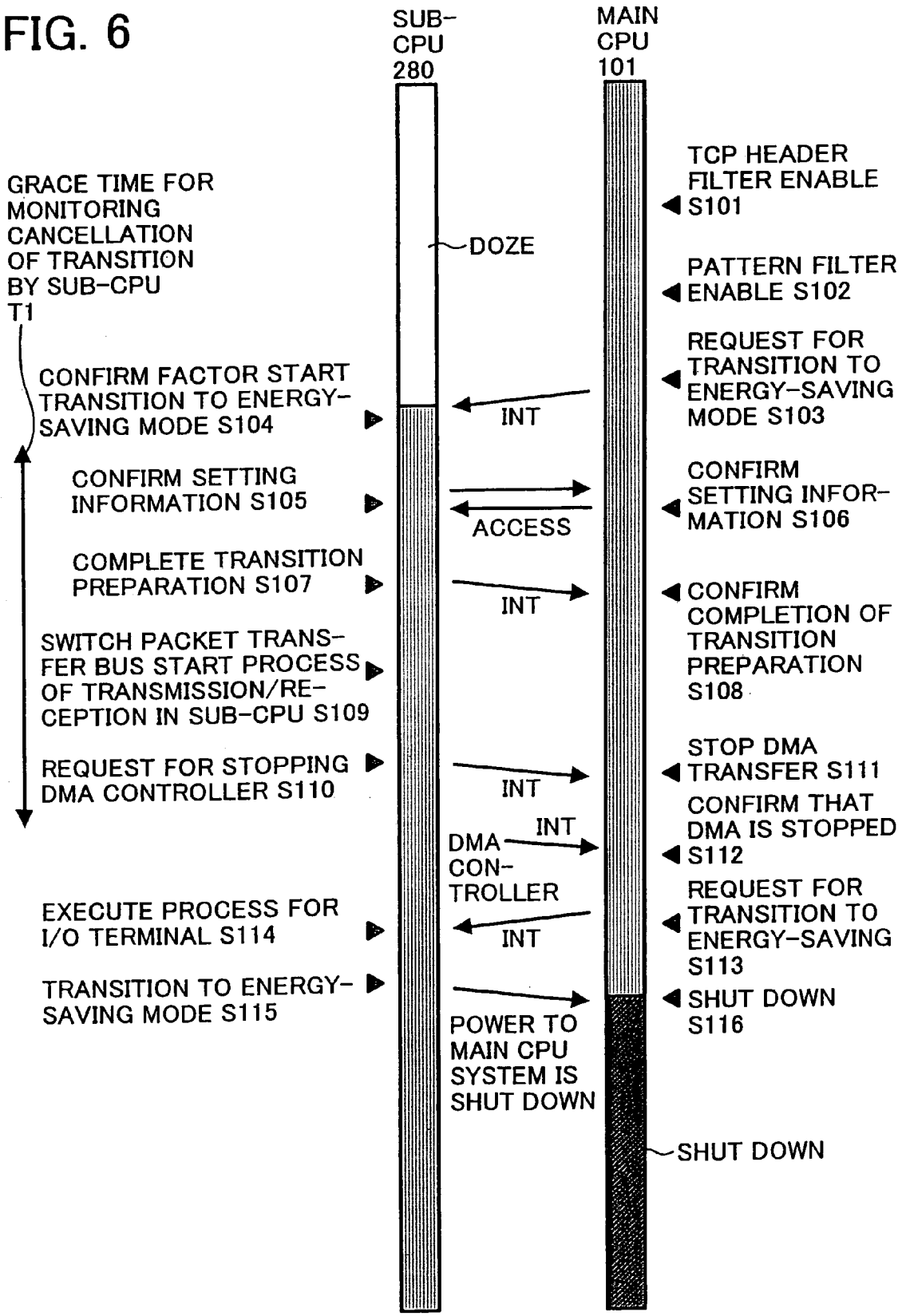
FIG. 6 is a diagram of operation statuses and process timings of a main CPU and a sub CPU upon transition from normal mode to energy-saving mode.

FIG. 6 is a diagram of operation statuses and process timings of the main CPU 101 and the sub CPU 280 upon transition from the normal mode to the energy-saving mode. In the normal mode, the main CPU 101 is in an operation status (energization status) and the sub CPU 280 is in a DOZE status (clock is stopped). Therefore, the sub CPU 280 is energized, but clock is not supplied thereto. Because of this, practically, the sub CPU 280 does not consume power. Since leak current passes even in this status, power consumption is not zero, but the consumption of power is in a minimum status.

In this status, at first, the main CPU 101 enables the packet type filter (TCP Header Filter in FIG. 6) 235-3 (step S101), and enables the pattern filter provided in the WOL 238 (step S102). Then, the main CPU 101 outputs a request for transition to the energy-saving mode in response to reception of an interrupt from the interrupt controller 239 (step S103). The request for transition to the energy-saving mode is outputted when a preset time passes since the last job is finished or when transition to the energy-saving mode is instructed from any one of the PCs 3, 4, and 5 which are connected to the network 6. Furthermore, the instruction may be inputted through the operation panel of the image forming apparatus 1. It is noted that "INT" indicates an interrupt in the following explanation including FIG. 6.

If the request for transition to the energy-saving mode is outputted to the sub CPU 280 in the above manner, the sub CPU 280 checks what is a factor for transition to the energy-saving mode. The factor in this case is confirmed by the output of the pattern filter. The sub CPU 280 confirms the factor for transition to the energy-saving mode and starts the process of transition to the energy-saving mode (step S104). In the process of transition to the energy-saving mode, at first, the sub CPU 280 accesses the main CPU 101 to make a request for confirmation of setting information (step S105). In this case, the setting information includes information for the network 6 and paper used in the image forming apparatus 1. When receiving the request from the sub CPU 280, the main CPU 101 transmits the setting information (step S106).

When receiving the confirmation of the setting information from the main CPU 101, the sub CPU 280 transmits a notification on completion of transition preparation to the main CPU 101 (step S107). The main CPU 101 confirms the notification (step S108), and enters a preparation stage of transition to the energy-saving mode. After completion of transition preparation to the energy-saving mode at step S107, the sub CPU 280 switches the packet transfer bus 289 to the sub CPU 280 side by the bus switching circuits 233a and 235a, and starts the process of transmission/reception (step S109). The sub CPU 280 wait for a grace time T1 for monitoring cancellation of transition to the energy-saving mode. If no factor to interrupt transition to the energy-saving mode occurs within the grace time T1 for monitoring, the sub CPU 280 outputs a request for stopping DMAC_rx 237 to the main CPU 101 (step S110). The grace time T1 for monitoring is set to a time at least from when the sub CPU 280 completes preparation for transition to the energy-saving mode until the main CPU 101 completes the process of a packet received through the network 6. Due to this setting, communications between the network 6 and the system of the image forming apparatus 1 is not interrupted, and therefore, the packet that is received and is to be processed is surely processed by the main CPU 101 or by the sub CPU 280. The grace time T1 for monitoring corresponds to also a time required for processing such packets as follows. The packets that are transferred beforehand and not yet processed by the main CPU 101 may remain in DMAC and the like even if the sub CPU 280 switches the packet transfer bus to the sub CPU 280 side at step S109. However, after the grace time passes, the process in the main CPU 101 is already finished even if the DMAC_rx 237 is stopped, which does not cause any packet unprocessed to remain.

When receiving the request for stopping the DMAC_tx 234 and the DMAC_rx 237 from the sub CPU 280, the main CPU 101 stops DMA transfer (step S111). When receiving an interrupt from the DMAC_tx 234 and the DMAC_rx 237, the main CPU 101 confirms that the DMA transfer is stopped (step S112), and outputs a request for transition to the energy-saving mode to the sub CPU 280 (step S113).

When receiving the request for transition to the energy-saving mode from the main CPU 101, the sub CPU 280 connects an I/O terminal to the side of the sub CPU 280, and executes the process for the I/O terminal explained later so that unnecessary power consumption does not occur from an external terminal when the power to the main CPU 101 is turned off (step S114). Then, the sub CPU 280 stops a power supply to the controller 100 including the main CPU 101 in order to set the main CPU 101 in the energy-saving mode (step S115). The power supply to the main CPU 101 is thereby cut off, and the controller 100 including the main CPU 101 enters a shutdown status (step S116). As a result, the transition to the energy-saving mode is completed, and a control right shifts from the main CPU 101 to the sub CPU 280, and the sub CPU 280 controls the image forming apparatus 1 until the energy-saving mode is cancelled.

The time T1 for monitoring from step S107 to step S110 is a period that is provided so that, when any factor that interrupts transition to the energy-saving mode occurs after preparation for transition to the energy-saving mode is completed, the factor can be dealt with. For example, if print information is contained in information received through the network 6, the main CPU 101 has to perform a printing process. In this case, the period covers a time for canceling the transition to the energy-saving mode and returning to the normal mode.

Figure 7:
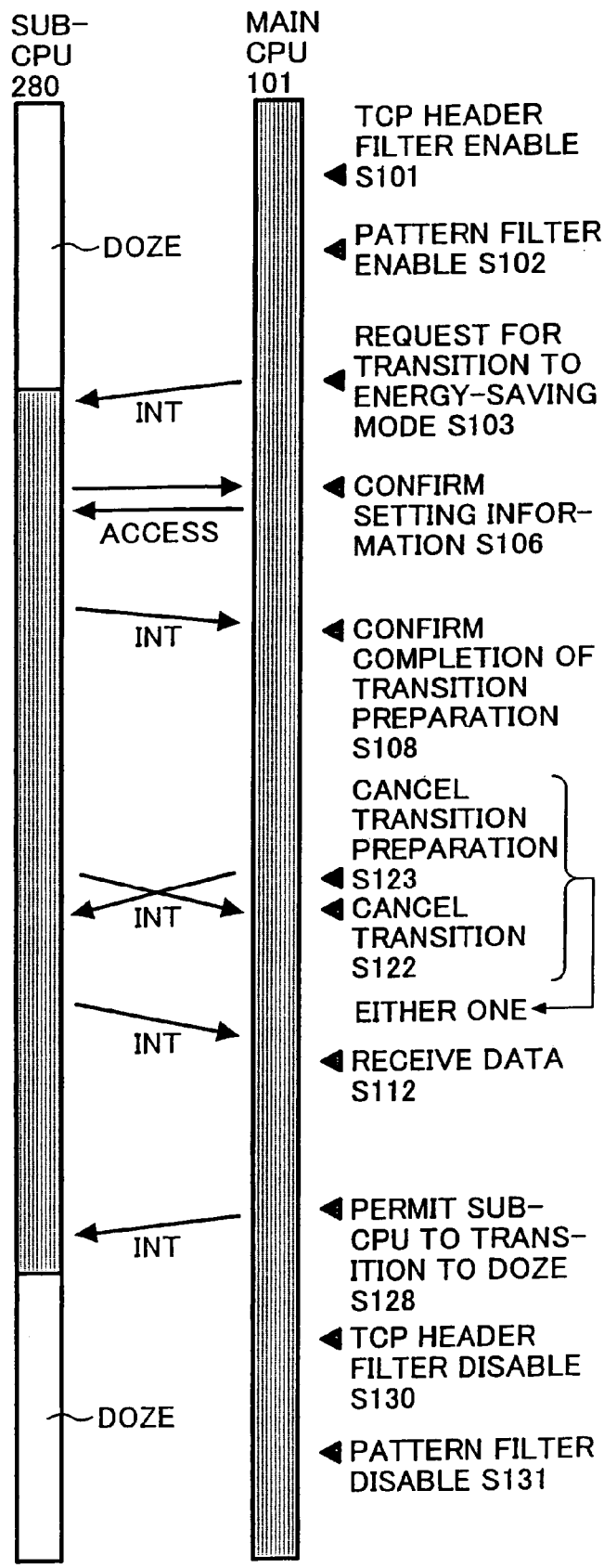
FIG. 7 is a diagram of operation statuses and process timings of the main CPU and the sub CPU when any factor that interrupts transition to the energy-saving mode occurs before a time for monitoring passes.

FIG. 7 is a diagram of operation statuses and process timings of the main CPU 101 and the sub CPU 280 when any factor that interrupts transition to the energy-saving mode occurs before the time T1 for monitoring passes. Here, the processes from step S101 to step S109 are executed in the same manner and at the same timing as that of the transition to the energy-saving mode.

At step S109, the sub CPU 280 switches the packet transfer bus 288 to the side of the sub CPU 280, and starts transmission/reception. If any factor that interrupts transition to the energy-saving mode occurs in the sub CPU 280 during the grace time T1 for monitoring that the transition is cancelled by the sub CPU 280, the transition preparation to the energy-saving mode is cancelled (step S121), and a massage about the cancellation is transmitted to the main CPU 101. When receiving the message, the main CPU 101 cancels the transition to the energy-saving mode (step S122). On the other hand, if any factor that interrupts transition to the energy-saving mode occurs in the main CPU 101, the transition preparation to the energy-saving mode is cancelled (step S123), and a message about the cancellation is transmitted to the sub CPU 280. When receiving this message, the sub CPU 280 cancels the transition to the energy-saving mode (step S124). If there is any packet that has been received by the sub CPU 280 and is to be processed in the main CPU 101 after the time T1 for monitoring passes, the sub CPU 280 transfers the packet to the main CPU 101 (step S125), and the main CPU 101 receives the packet (step S126).

The factor that interrupts transition to the energy-saving mode includes a case where a magic packet explained later is transmitted to the Wake On LAN 238, and a case as an internal factor where print data is inputted from the USB 210 or the IEEE 1284 220 to the power management unit 241. The factor also includes a case as an external factor where a start button is depressed through the operation unit of the image forming apparatus 1 or an instruction to perform an operation is inputted, the operation being related to an image forming operation, such as operating a pressure plate of an auto document feeder (ADF). The factor further includes a case where data to be printed in the main CPU 101 is transferred from the network 6. If such factor occurs, transition to the energy-saving mode prevents printing. Therefore, the main CPU 101 is caused to operate in the normal mode without transition to the energy-saving mode.

After the data is transmitted to the main CPU 101 at step S125, the sub CPU 280 switches back the packet transfer bus 288, which has been switched at step S109, to the main CPU 101 side, and stops the process of data transmission/reception (step S127). After the packet transfer bus 288 is switched back to the main CPU 101 side, the main CPU 101 permits the sub CPU 280 to transit to DOZE (step S128). The sub CPU 280 checks the external factors and the internal factors, stops the clock if there is no trouble in the transition to DOZE, and transits to the DOZE status (step S129). Since the sub CPU 208 returns to the normal mode in this status, the main CPU 101 controls so as to disable the packet filter (TCP Header Filter) (step S130) and disable the pattern filter (step S131), and fully returns to the normal mode.

By controlling the processes in the above manner, even after the transition process to the energy-saving mode is started, it is possible to return to the normal mode without transition to the energy-saving mode. Furthermore, since both the main CPU 101 and the sub CPU 280 operate during the transition and the returning periods, communication is not interrupted on the network. Accordingly, no data missing occurs.

Figure 8:
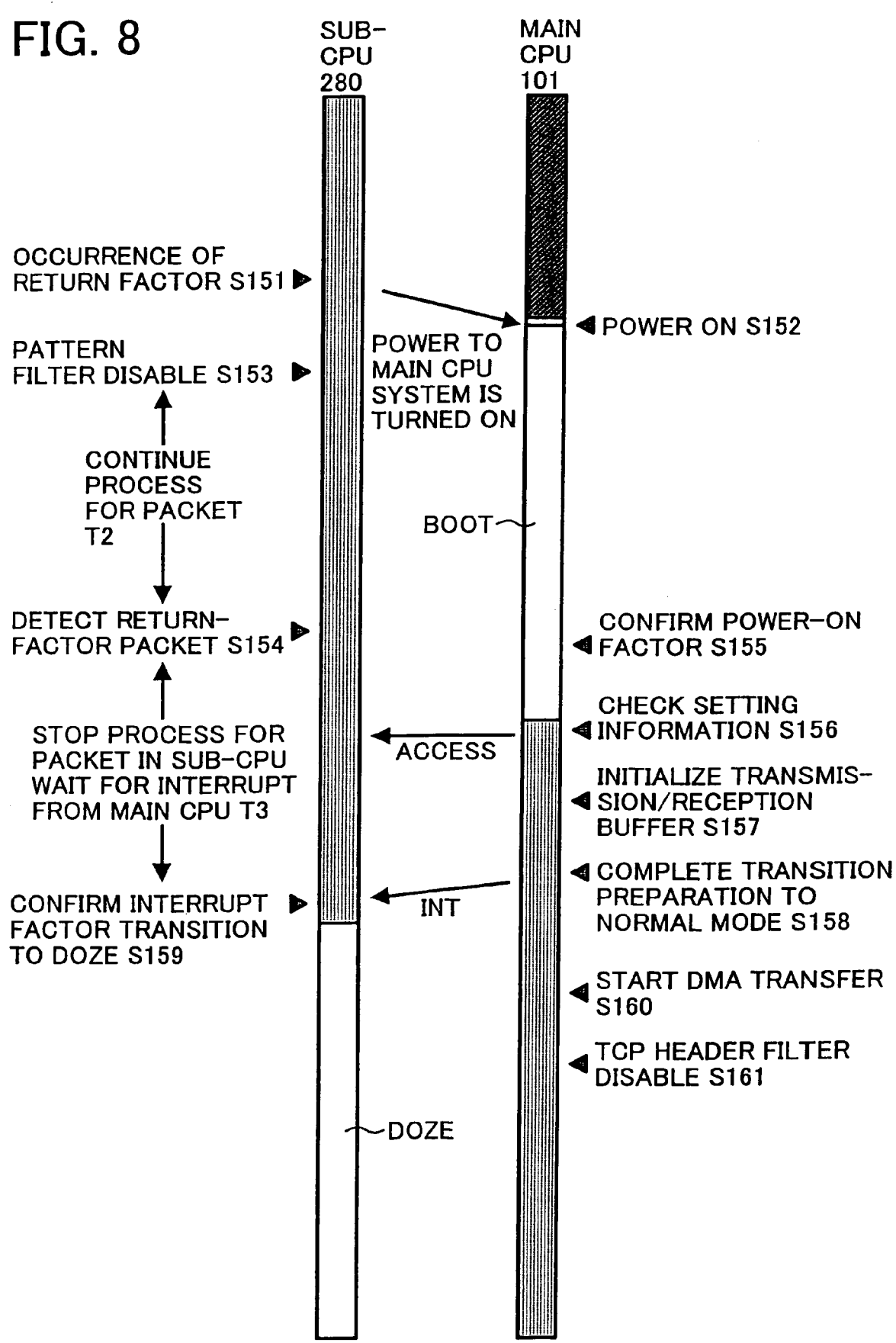
FIG. 8 is a diagram of operation statuses and process timings of the main CPU and the sub CPU upon returning from the energy-saving mode to the normal mode.

FIG. 8 is a diagram of operation statuses and process timings of the main CPU and the sub CPU upon returning from the energy-saving mode to the normal mode. The statuses of FIG. 8 indicate that the main CPU 101 is off (shut down) and the sub CPU 280 operates in the energy-saving mode. In such statuses, if a factor to return from the energy-saving mode to the normal mode occurs in the sub CPU 280 (step S151), the sub CPU 280 turns on the power to the main CPU 101 (step S152). The factor to return from the energy-saving mode to the normal mode includes a case where it is found in the packet type filter 235-3 explained later that a particular packet, i.e., a synchronous idle (SYN) packet (SYN flag) here is contained in a packet received from the network 6. The factor also includes a case where a signal is inputted to the power management unit 241 from the USB 210 or the IEEE 1284 220, a case where an operation signal before imaging process is inputted from the outside, just like the case where there is an input from the operation unit or the pressure plate of the ADF is operated. These cases so far are the external factors. Furthermore, the factor includes a case where the pattern filter provided in the WOL 238 detects a pattern indicating the return factor.

The power is turned on when the power controller 251 transmits a signal, indicating that the power is supplied to the main CPU 101, to the power supply unit (PSU) 310 through the power control line 250. By turning on the power to the main. CPU 101 in the above manner, the main CPU 101 executes boot process and executes a series of processes for start-up. On the other hand, the sub CPU 280 continues the packet process by disabling the pattern filter (step S153) (T2) This is because the main CPU 101 is impossible to perform the packet process since it is in the power-on status yet in the boot status. The sub CPU 280 continues the packet process (step S154) until a packet that causes a return factor (hereinafter, "return-factor packet") (SYN packet in the embodiment) is detected. The sub CPU 280 stops the packet process when detecting the return-factor packet, and waits for an interrupt from the main CPU 101 (T3). Detection of an interrupt factor at step S154 indicates a case where after a packet is not inputted from the pattern filter by disabling the pattern filter at step S153, the packet process in the sub CPU 280 progresses, and the sub CPU 280 detects the packet that causes the return factor. This means that there is no packet to be processed in the sub CPU 280 hereinafter even if the main CPU 101 processes a packet.

The main CPU 101 confirms the factor for power-on at the end of the boot process (step S155), and enters an operation status. Then, the main CPU 101 accesses the sub CPU 280, checks a setting condition (step S156), and initializes a transmission/reception buffer (the tx buffer 232$t$ and the rx buffer 232$r$) (step S157). In this status, the mode can return to the normal mode, the main CPU 101 issues an interrupt and notifies the sub CPU 280 that transition preparation to the normal mode is completed (step S158). Since the sub CPU 280 is waiting for the interrupt from the main CPU 101, the sub CPU 280 transits to the DOZE status when confirming the interrupt at step S158 (step S159). Since the mode returns to the normal mode, the main CPU 101 starts DMA transfer (step S160) and disables the packet type filter (TCP Header Filter) 235-3 (step S161). This allows the packet inputted to the mac_rxif 235 to once enter the rx RAM 236, but the packet is not subjected to filtering process and is transmitted to the controller 100 as it is, and is processed in the main CPU 101 after being stored in the memory 103.

Disabling the pattern filter (pattern filter disable) at step S153 is preferably set at earlier timing after the return factor occurs at step S151. This is because the earlier timing allows a lower possibility of overlap of power-on signals. The packet type filter 235-3 at step S161 is set so as to be disabled after the sub CPU 280 transits to the DOZE status. This is because a possibility such that a packet process, to be processed in the sub CPU 280 may remain is excluded. The packet process to be processed in the sub CPU 280 is surely finished, and all the packets transferred through the network 6 when the sub CPU 280 does not operate are transmitted to the main CPU 101.

Accordingly, communications are not interrupted on the network even during returning from the energy-saving mode to the normal mode.

Figure 9:
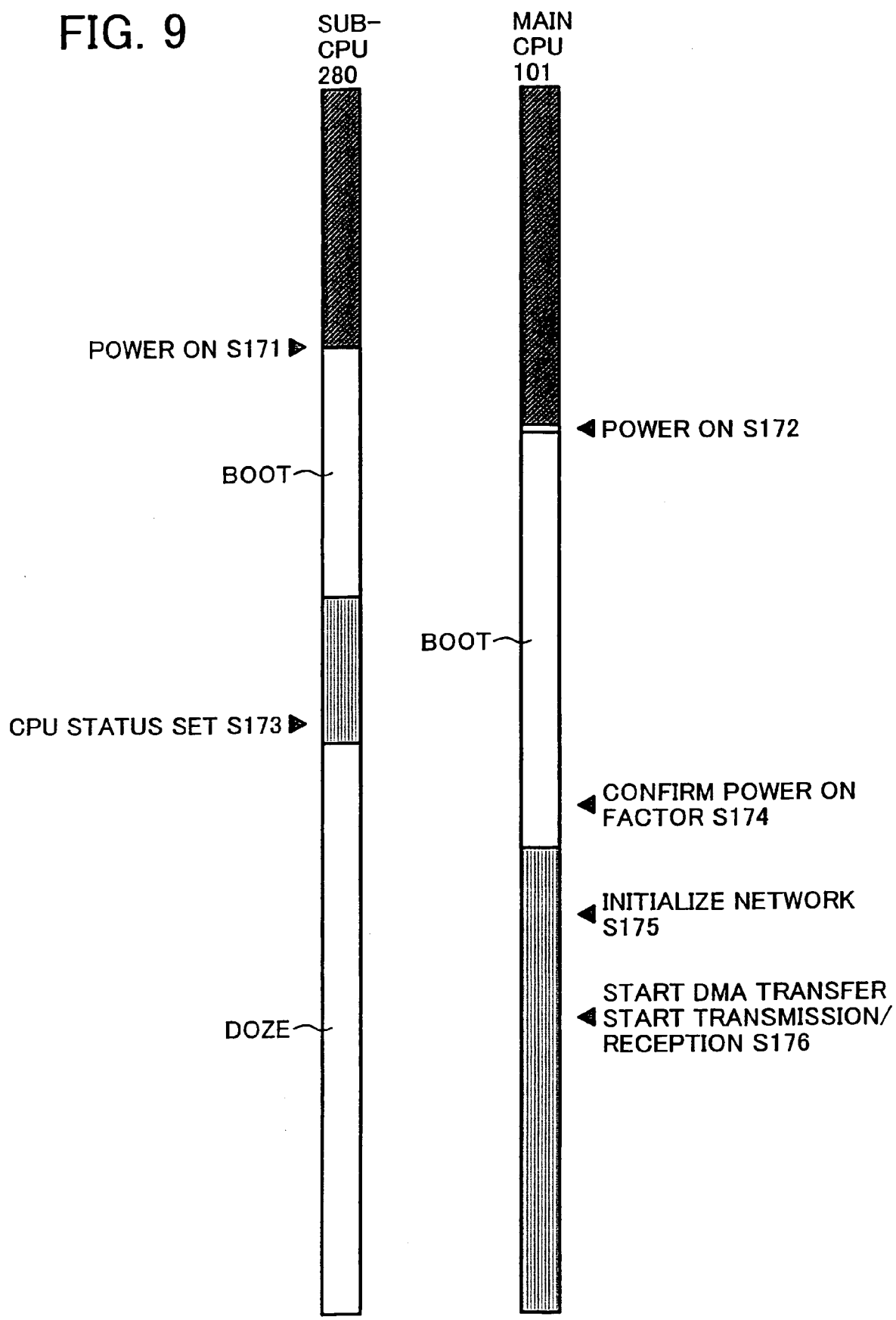

FIG. 9 is a diagram of operation statuses and process timings of the main CPU 101 and the sub CPU 280 at power-on. In the embodiment, because the sub CPU 280 controls the power to the main CPU 101, the power to the sub CPU 280 is first turned on as shown in FIG. 9 at power-on (step S171), and then the power to the main CPU 101 is turned on (step S172). Thereafter, the two execute the boot process. The sub CPU 280 boots up first, sets the status of the sub CPU 280 in the RAM 286 (step S173), stops the clock, and enters the DOZE status.

On the other hand, the main CPU 101 boots up after checking a factor for power-on, that is, a set content written in the RAM 286 (step S174), initializes network-related components to enable communication with the network 6 (step S175), and starts DMA transfer and communications (step S176). Accordingly, the main CPU 101 enters the operation status to operate in the normal mode. At this time, the sub CPU 280 has been in the DOZE status which is in the energy-saving status.

The process for the I/O terminal executed at step S114 indicates the process as explained below.

The system as shown in FIG. 2 and FIG. 3 controls the I/O terminal used in the PCI bus so as to be in a high impedance (Hi-Z) status before the power is shut down, and blocks a current to be flowed into the ASIC in the side where the power is shut down, by holding the I/O terminal in the Hi-Z status during power-down. This allows promotion of lower power consumption. By holding the I/O terminal in the Hi-Z status in the above manner, not only the lower power consumption but also the suppression of occurrence of malfunction and the reliability of control are intended. That is, only shutting down the power is not enough to avoid risks as follows. More specifically, malfunction may occur because charges stored during the power-down flow to the side that is not intended, or a short circuit may occur to cause a large current to flow and elements to be broken. Therefore, in the embodiment, by setting the I/O terminal 261 to be the Hi-Z status, occurrence of such events is prevented.

Holding of the Hi-Z status is achieved in the following manner. That is, an enable bit is previously prepared in a register (not shown) to cause the I/O terminal to hold the Hi-Z status, and the sub CPU 280 rewrites the corresponding bit of the register so that the enable bit is latched in a flip-flop (not shown). Furthermore, the sub CPU 280 rewrites a corresponding bit to disable the Hi-Z status. Basically, the enable bit is prepared for each related I/O terminal (each function) such as a PCI bus, a general I/O, and a secure digital (SD) card. In the embodiment, the I/O terminal is referred to as the I/O terminal 261, but it may be referred to as an I/O pin or simply "Pin".

Figure 10:
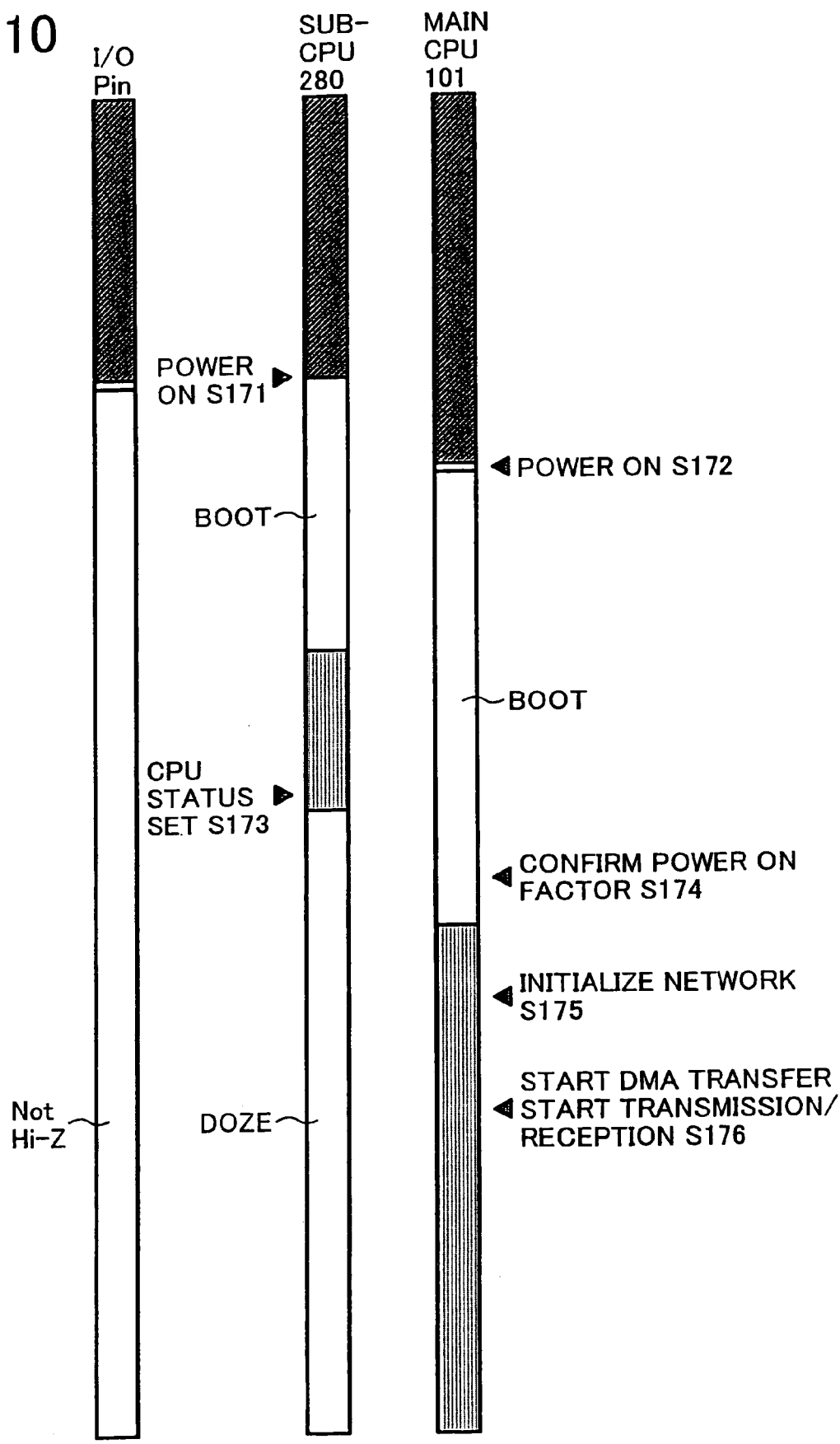
FIG. 10 is a diagram of a status of an I/O terminal in relation to the statuses at power-on of FIG. 9.

FIG. 10 is a diagram of a status of an I/O terminal in relation to the statuses at power-on of FIG. 9. The I/O terminal of FIG. 10 represents a status in which the I/O terminal can control the ASIC in the power control side to the Hi-Z status. In this embodiment, the main CPU 101 is in the status equivalent to the status of the ASIC in the power controlled side, and the sub CPU 280 is in the status equivalent to the status of the ASIC in the power control side. Therefore, the I/O terminal of FIG. 10 indicates the status of the I/O terminal controlled by the sub CPU 280.

The I/O terminal that can be controlled to the Hi-Z is not controlled to the Hi-Z immediately after the power to the system is turned on. In other words, when the main CPU 101 (ASIC in the power controlled side) is active, the I/O terminal of the sub CPU 280 (ASIC in the power control side) is not controlled tolthe Hi-Z. However, the I/O terminal may enter the Hi-Z status for an arbitrary time as a part of normal functions.

Upon transition to the low power consumption mode (energy-saving mode), as explained with reference to FIG. 6, if a request for transition to the energy-saving mode is notified from the main CPU 101 (step S113), the sub CPU 280 executes the process for the I/O terminal (step S114), and controls the I/O terminal of the sub CPU 280 (ASIC in the power shutting down side) connected to the main CPU 101 (ASIC in the power controlled side), to the Hi-Z status. Thereafter, the sub CPU 280 transits to the energy-saving mode at step S116 and shuts down the power to the main CPU 101 immediately after the transition (Shutdown status of FIG. 6). The I/O terminal of the sub CPU 280 connected to the main CPU 101 is hold in the Hi-Z status during the energy-saving mode. According to the operations, it is possible to block a current flowing into the main CPU 101 in the low power consumption mode, and to achieve further lower power consumption.

Figure 11:
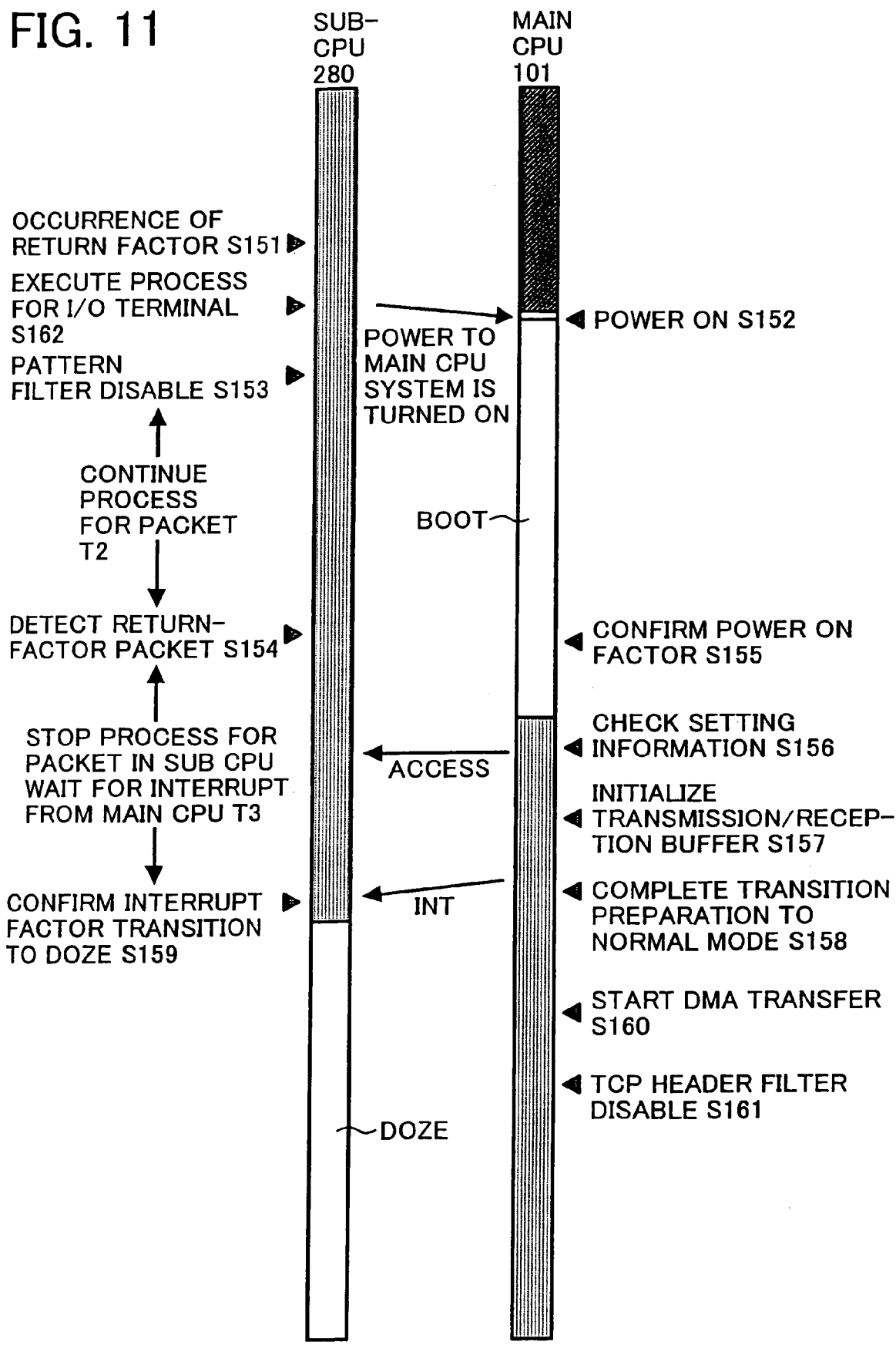
FIG. 11 is a diagram of operation statuses and process timings of the main CPU and the sub CPU upon returning from the energy-saving mode to the normal mode.

FIG. 11 is a diagram of operation statuses and process timings of the main CPU 101 and the sub CPU 280 upon returning from the energy-saving mode to the normal mode. Upon returning from the energy-saving mode to the normal mode, the power to the main CPU 101 (ASIC in the first power-down side) is turned on at step S152 as shown in FIG. 11, and the sub CPU 280 (ASIC in the power shutting down side) executes the process for the I/O terminal (step S162) and releases the Hi-Z status of the I/O terminal connected to the main CPU 101 (ASIC in the first power-down side). By these operations, it is possible to block a current flowing into the main CPU 101 (ASIC in the power-down side) at the instant when the power thereto is turned on upon transition from the energy-saving mode to the normal mode. The other processes not particularly explained here are the same as these of FIG. 8, and therefore, explanation thereof is omitted.

An actual control procedure is shown in a flowchart of FIG. 12.

When preparation for transition from the normal mode to the low power consumption mode is completed (steps S181 and S182, which correspond to step S107 of FIG. 6), the sub CPU 280 (ASIC in the power shutting down side) sets the I/O terminal connected to the main CPU 101 (ASIC in the power-down side), to the Hi-Z status (steps S183, which corresponds to step S114 of FIG. 6), and shuts down the power to the main CPU 101 (ASIC in the power-down side) (steps S184, which corresponds to step S116 of FIG. 6). During the energy-saving mode, the I/O terminal of the sub CPU 280 (ASIC in the power shutting down side) connected to the main CPU 101 (ASIC in the power-down side) is hold in the Hi-Z status as it is.

If any process that cannot be processed by the sub CPU 280 (ASIC in the power shutting downside) occurs during the energy-saving mode (occurrence of a factor for transition to the normal mode) (step S185, which corresponds to step S151 of FIG. 11), the power to the main CPU 101 (ASIC in the power-down side) is turned on (steps S186, which corresponds to step S152 of FIG. 11). Then, the Hi-Z status of the I/O terminal of the sub CPU 280 (ASIC in the power shutting down side) connected to the main CPU 101 is released (steps S187, which corresponds to step S162 of FIG. 11), and the mode returns to the normal mode (step S189). Full return to the normal mode is achieved when the sub CPU 280 enters the DOZE status at step S159 of FIG. 11 and the packet type filter (TCP Header Filter) is disabled at step S161 of FIG. 11.

As explained in the embodiment, packets received are selected by the packet type filter (TCP Header Filter) 235-3 and by the pattern filter, and a predetermined process is performed thereon.

FIG. 13 is a diagram of a structure of an IP packet that is filtered by the packet type filter 235-3. An IP packet 20 includes an IP header 201, a TCP header 202, and TCP data 203. The TCP header 202 and the TCP data 203 form a TCP datagram 204, and the TCP datagram 204 and the IP header 201 form an IP datagram 205.

Figure 14:
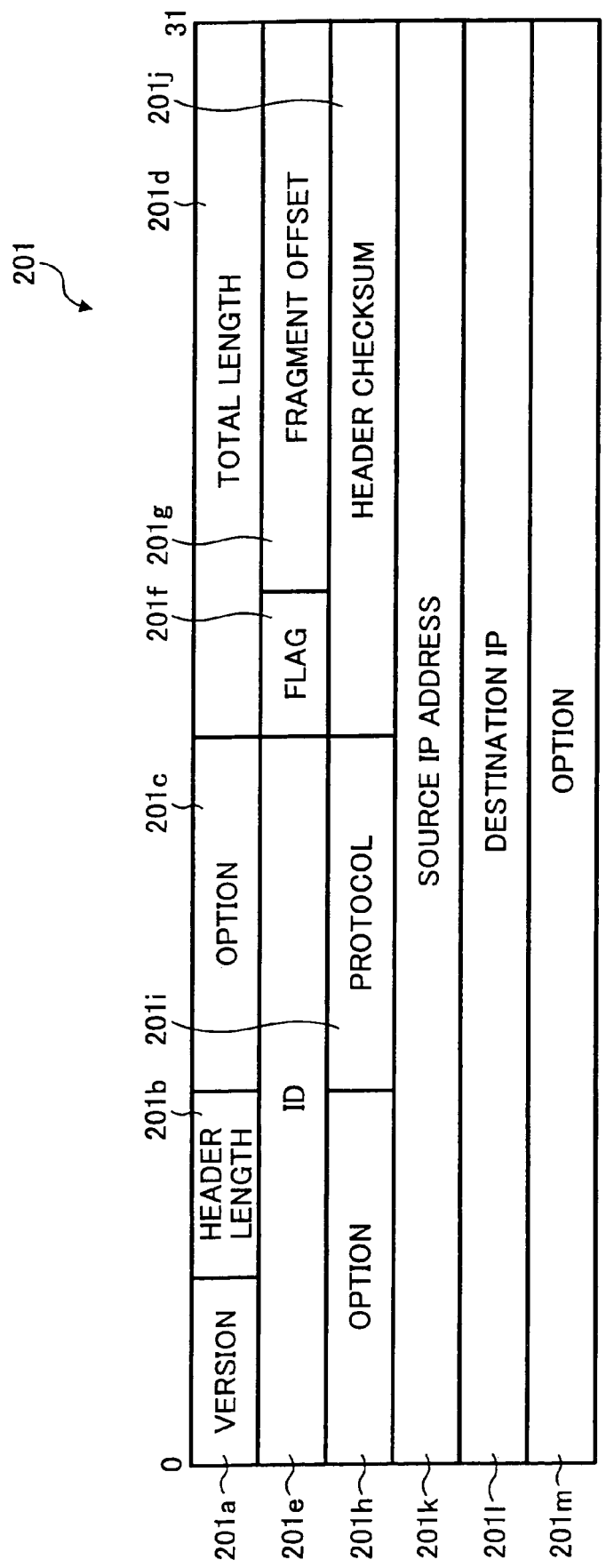
FIG. 14 is a diagram of an IP header of FIG. 13.

FIG. 14 is a diagram of an internal structure of an IP header format that is a format of the IP header 201 of FIG. 13. The IP header format includes a version information-field 201*a*, a header length field 201*b*, a Type Of Service (TOS) field 201*c*, a total length field 201d, an identification (ID) field 201e, a flag field 201f, a fragment offset field 201g, a Time To Live (TTL) field 201h, a protocol field 201i, a header checksum field 201j, a source IP address field 201k, a destination IP address field 201l, and an option field 201m.

In this structure, the version information field 201a is fixed to 4, and the header length (IP header length) field 201b indicates a header length including an option area. The TOS field 201c gives an instruction which of packet processes is preferentially selected. The total length (IP packet length) field 201d indicates the whole length of the IP packet 20. The identification (ID) field 201e and the fragment offset field 201g are used to realize fragment (division of packet) and reassembly in IP level. The TTL field 201h indicates a remaining live time of the IP packet on the network. The header checksum field 201j is a checksum for only an IP header portion.

Figure 15:
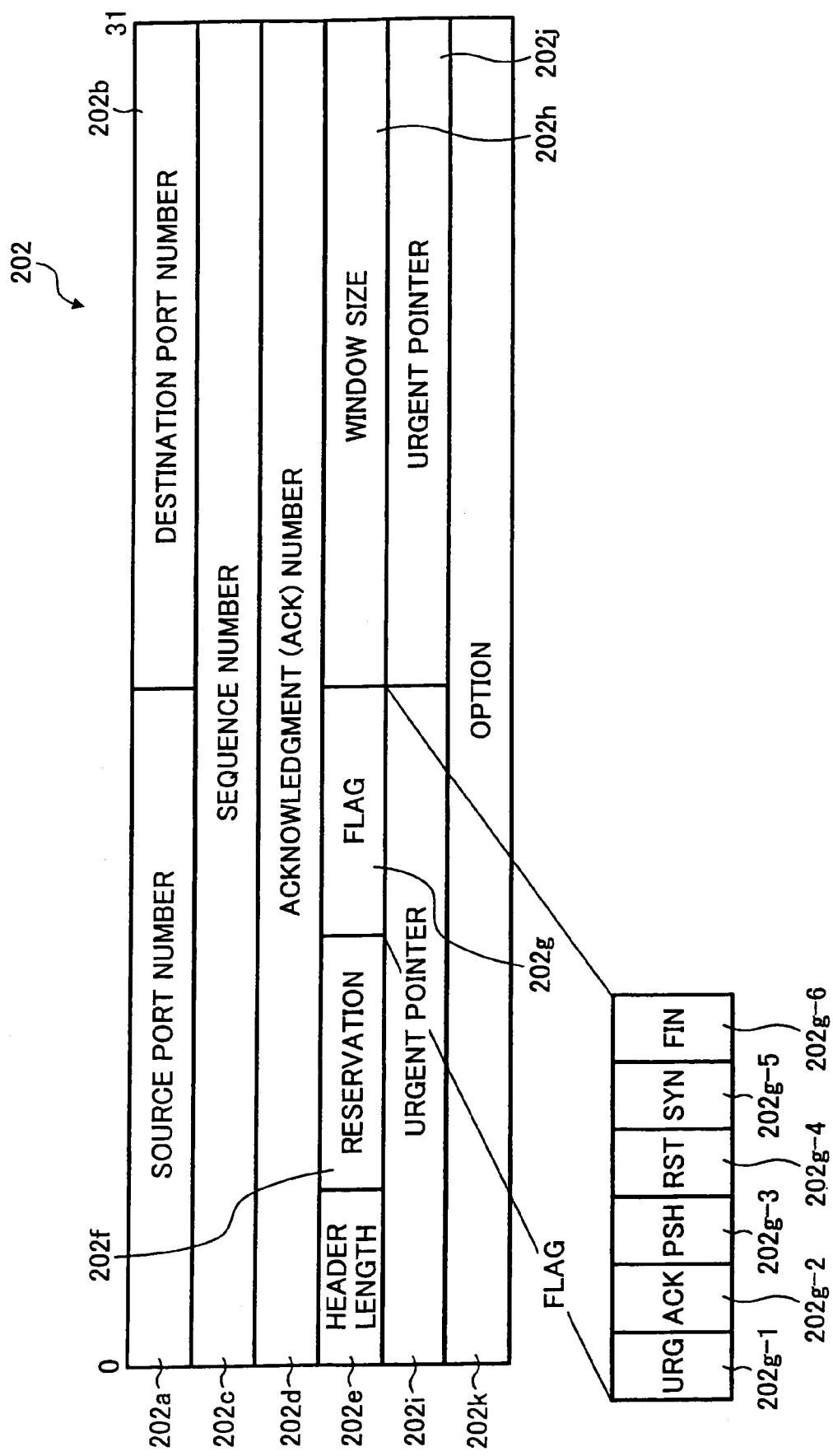
FIG. 15 is a diagram of a TCP header of FIG. 13.

FIG. 15 is a diagram of an internal structure of a TCP header format that is a format of the TCP header 202 of FIG. 13. The TCP header format includes a source port number field 202a, a destination port number field 202b, a sequence number field 202c, an acknowledgement (AKC) number field 202d, a header length field 202e, a reservation field 202f, a flag field 202g, a window size field 202h, a TCP checksum field 202i, an urgent pointer field 202j, and an option field 202k.

The source port number field 202a indicates a TCP port number of a source, and the destination port number field 202b indicates a TCP port number of a destination. The sequence number field 202c indicates in which part of a data stream a packet is located. A sequence number of acknowledgement (ACK) corresponding to a packet received is written in the acknowledgement number field 202d, and up to which part of the packet is received is notified to a sender. The header length field 202e indicates a TCP header length, and the header length changes according to presence or absence of the option field 202k. Six types of flags as URG to FIN are written in the flag field 202g, and the window size field 202h notifies the sender of the size of the window received. In the TCP checksum field 202i, calculation is carried out for both the TCP header and the data (using a part of information for the IP header). The urgent pointer field 202j indicates the end of urgent data.

The six types of flags of the flag field 202g includes, as shown in FIG. 15, a URG flag 202g-1, an ACK flag 202g-2, a PSH flag 202g-3, a RST flag 202g-4, a SYN flag 202g-5, and a FIN flag 202g-6. The URG (urgent) flag 202g-1 indicates that an urgent pointer of the urgent pointer field 202j is active. The ACK flag 202g-2 indicates that an acknowledgment number of the acknowledgement number field 202d is active, and generally, this flag is always on. The PSH (PUSH) flag 202g-3 indicates that data is transmitted as soon as possible. The RST (RESET) flag 202g-4 is a flag indicating a request for resetting a connection. The SYN flag 202g-5 is a flag indicating a request for establishment of a connection, and the FIN flag 202g-6 is a flag indicating a request for finishing the connection.

Figure 16:
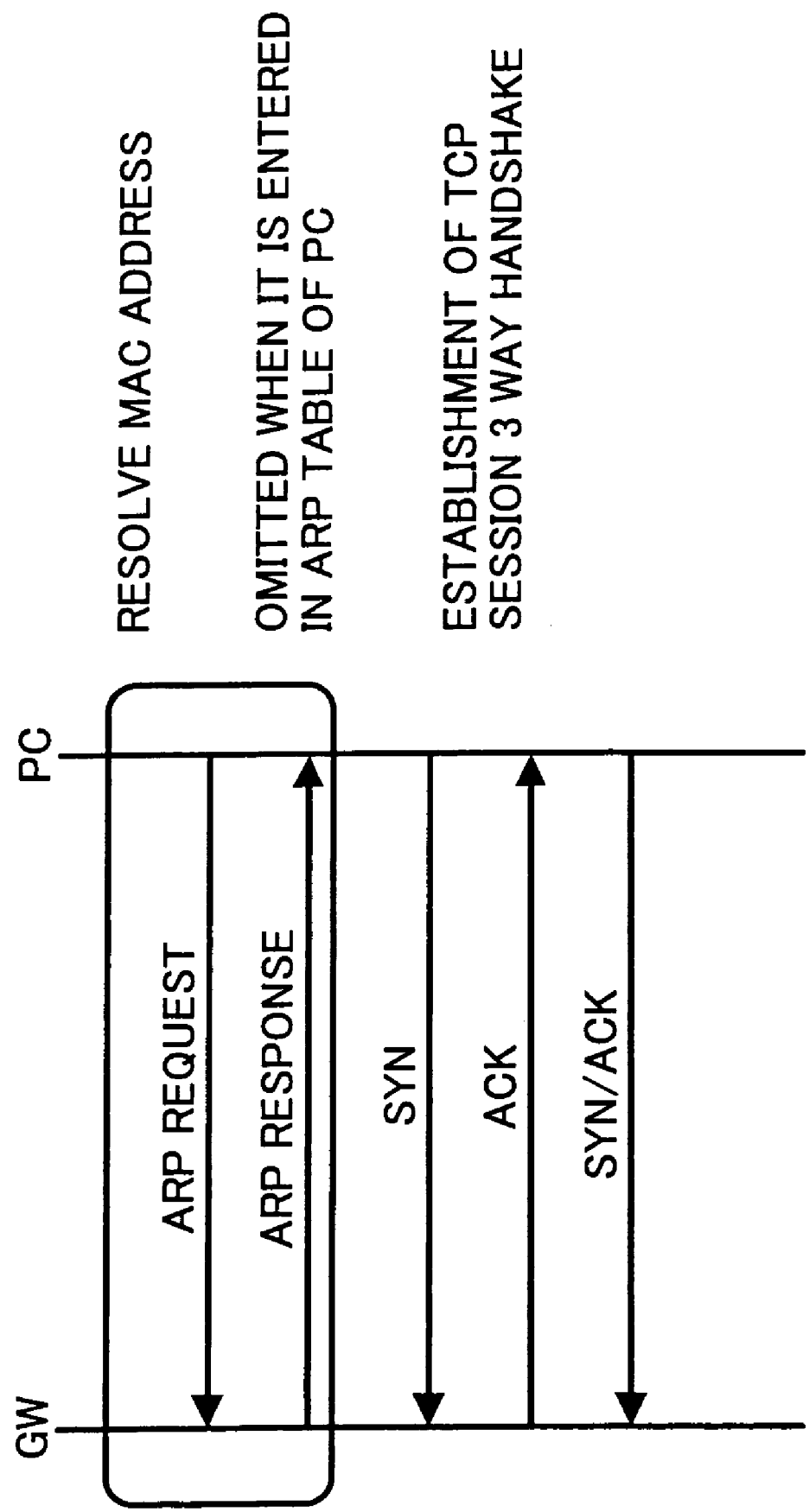
FIG. 16 is a diagram of a basic connection sequence of a TCP protocol.

FIG. 16 is a diagram of a basic connection sequence of the TCP protocol. In the connection sequence, a PC transmits an address resolution protocol (ARP) request to a Gateway (GW). If an ARP response is returned from the GW and the address is resolved, the PC transmits SYN to the GW. If ACK is returned from the GW, a TCP session is established, and the PC further transmits SYN/ACK to the GW, and then communications are performed.

In the embodiment, in addition to the packet type filter (TCP Header Filter) 235-3 provided in the mac_rxif 235, a pattern filter is provided in the Wake On LAN 238. Therefore, a packet so-called a magic packet is subjected to filtering by a pattern matching and a predetermined process is executed.

The function of the Wake On LAN 238 is to enable start-up from another machine over a network, herein from a PC. The PC transmits a wake-up frame (i.e., magic packet) when the image forming apparatus 1 is in the energy-saving mode. If the wake-up frame includes a correct MAC address, the image forming apparatus returns from a standby or a suspend status and functions in the normal mode.

Selection of the magic packet is performed by providing a field for 64-byte pattern matching in a packet to be received, and performing pattern matching between data written in the field and data preset in the pattern filter of the Wake On LAN 238. If there is a pattern match, the Wake On LAN 238 wakes up the system. The wake-up of the system is performed in the following manner. The pattern filter performs pattern matching on a packet received by the Wake On LAN 238 through the MAC IP 232, the mac_rxif 235, and the WOL i/f 235-2. If there is a pattern match, it is determined that a magic packet is received. Based on the determination, the Wake On LAN 238 instructs the power management unit 241 so that the power controller 251 turns on the power to the main CPU 101. The power controller 251 outputs an instruction to supply power from the power control line 250 to the power supply unit 310 based on the instruction, and the power is supplied to the controller 100 including the main CPU 101. The procedure corresponds to the processes at step S151 and step S152 of FIG. 8 at which the power to the main CPU 101 is turned on by the magic packet that becomes a return factor, and the energy-saving mode returns to the normal mode.

At this time, it is shown in FIG. 8 that the return factor occurs in the sub CPU 280 (step S151), but this does not indicate more than the fact that the sub CPU 280 is operating at this time. This means that the sub CPU 280 does not return the energy-saving mode to the normal mode. Since the procedure of detecting the magic packet and returning from the energy-saving mode to the normal mode is started, there is no need to function the pattern filter. Moreover, there is a need to avoid the risk of malfunction caused by the pattern filter. Because of these reasons, the pattern filter is disabled at step S153.

It is decided whether the packet type filter and the pattern filter are caused to function, using the energy-saving mode and the normal mode.

In the embodiment, in the energy-saving mode, the SYN flag 202g-5 is detected by the packet type filter (TCP Header Filter) 235-3 provided in the downstream of the mac_rxif 235 (see FIG. 4), and the packet including the SYN flag 202g-5 is processed by the main CPU 101 after the main CPU 101 is activated. However, in the normal mode, all the controls are executed by the main CPU 101. Therefore, there is no need to distinguish a packet including the SYN flag from a packet without it. Consequently, it is necessary to set turning on and off the packet type filter (TCP Header Filter) 235-3 and set operation or non-operation according to a mode and the status of a process. The pattern filter may function when the energy-saving mode is on, and does not therefore need to function in the normal mode. Furthermore, if the pattern filter functions in the normal mode, because the main CPU 101 is already in the power-on status, the power-on control is further performed in its power-on status, this may cause malfunction. Therefore, the pattern filter is required to set operation or non-operation according to the mode or the status of the process.

Figure 17:
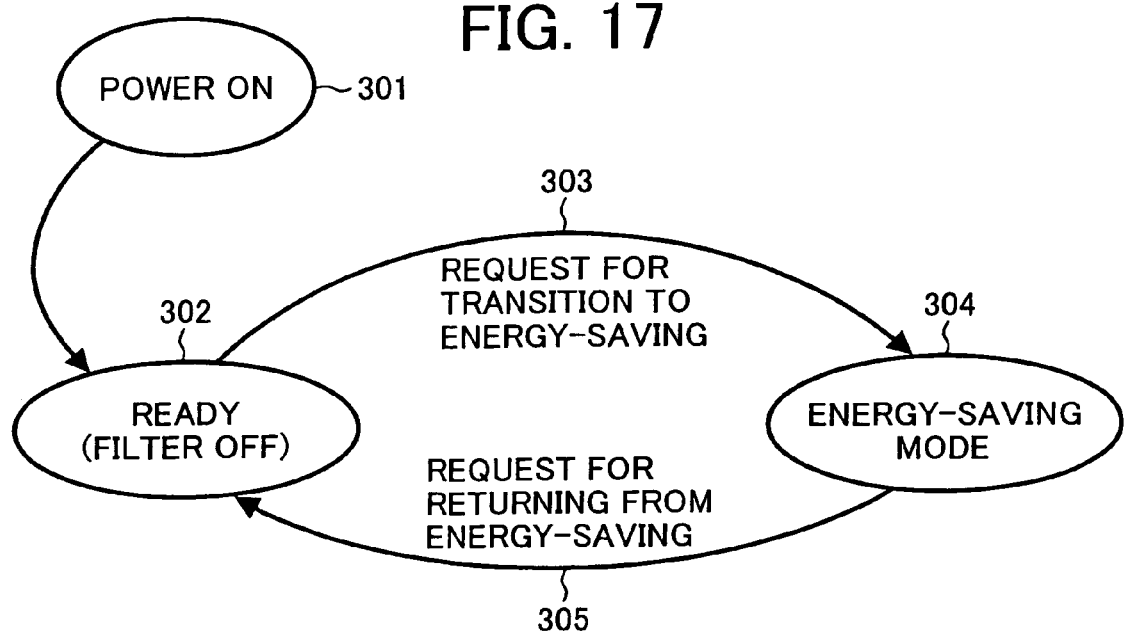
FIG. 17 is an energy-saving status transition diagram.

FIG. 17 is an energy-saving status transition diagram upon reception of a request for transition to the energy-saving mode and upon reception of a request for returning from the energy-saving mode. When the power is turned on (step S301), at first, the main CPU 101 operates in the normal mode (step S302). At this time, both the packet type filter (TCP Header Filter) 235-3 and the pattern filter are in the off status. In this status, if there is a request for transition to the energy-saving mode from the main CPU 101 to the sub CPU 280 (step S303, which corresponds to step S103 of FIG. 6), the transition to the energy-saving mode is effected (step S304, which corresponds to step S115 and step S116). At this time, both the packet type filter (TCP Header Filter) 235-3 and the pattern filter are in the on status (step S101, step S102). Then, if a return factor occurs (step S151) and the energy-saving mode returns to the normal mode by a request for returning from the energy-saving mode (step S305), the sub CPU 280 turns off the pattern filter at step S153, and the main CPU 101 turns off the packet type filter 235-3 at step S161. By repeating such filter control in the ready status (normal mode) for the energy-saving mode and in the energy-saving mode, energy-saving control is executed.

Figure 18:
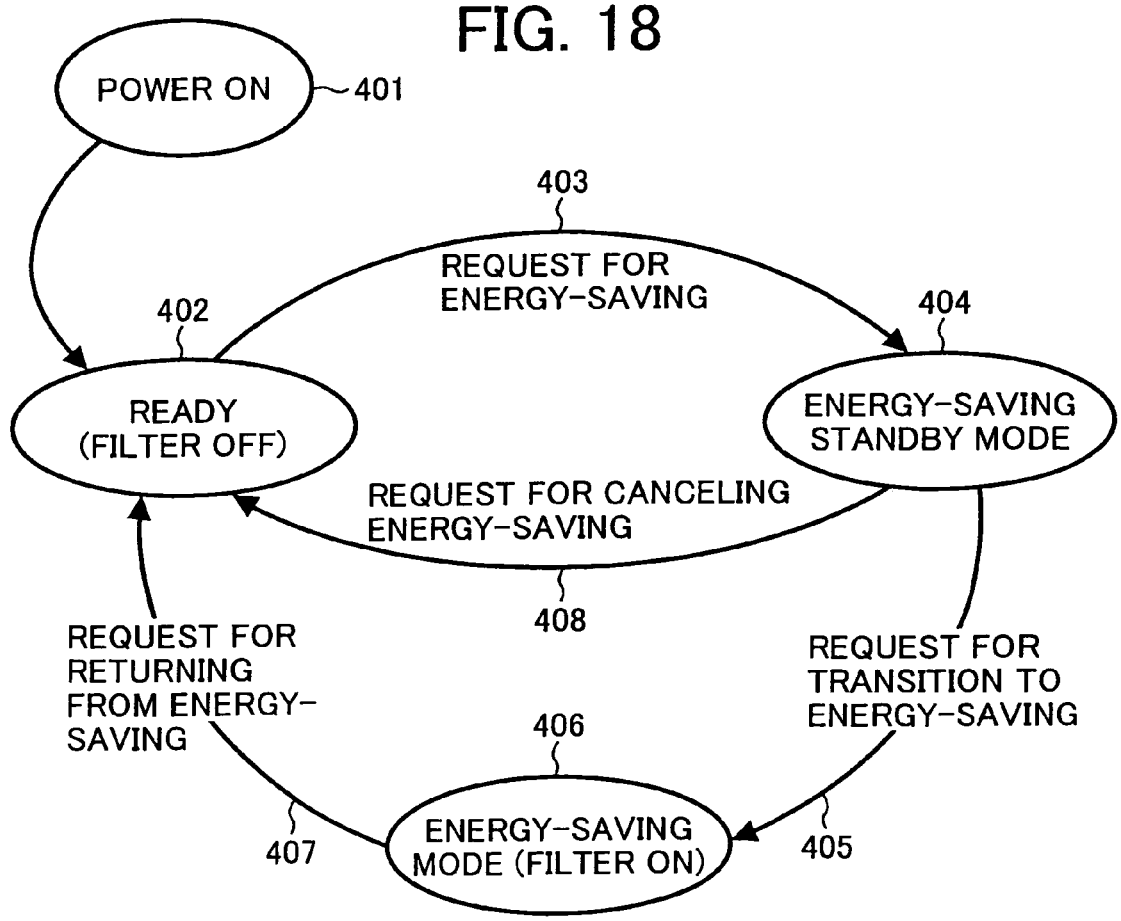
FIG. 18 is another energy-saving status transition diagram.

FIG. 18 is an energy-saving status transition diagram upon reception of a request for transition to the energy-saving mode including a process of canceling the transition to the energy-saving mode as shown in FIG. 7 and upon reception of a request for returning from the energy-saving mode. The transition of this energy-saving status indicates a case where the processes from step S121 to step S124 of FIG. 7 are included in the energy-saving status transition diagram of FIG. 17. In other words, when the power is turned on (step S401), the main CPU 101 operates in the normal mode (step S402). At this time, both the packet type filter (TCP Header Filter) 235-3 and the pattern filter are in the off status. In this status, if there is a request for transition to the energy-saving mode from the main CPU 101 to the sub CPU 280 (step S103), the sub CPU 280 starts transition to the energy-saving mode (step S105). When the preparation for the transition is completed (step S107, step S108), the sub CPU 280 switches the packet transfer bus (step S109), and it is monitored whether transition is cancelled by the sub CPU 280 (step S404). This is called herein "energy-saving standby mode". In the monitoring status, both the packet type filter (TCP Header Filter) 235-3 and the pattern filter are turned on at step S101 and step S102.

In the energy-saving standby mode at step S404, if the packet type filter (TCP Header Filter) 235-3 detects the SYN flag, establishment of connection with the network 6 is required. Therefore, a request for canceling the energy-saving mode is transmitted to the main CPU 101 (step S408, which corresponds to step S121). With this request, the main CPU 101 returns to the ready status (step S402), and both the packet type filter (TCP Header Filter) 235-3 and the pattern filter are turned off at step S130 and step S131.

Furthermore, in the energy-saving standby mode at step S404, if the packet type filter 235-3 does not detect the SYN flag before the grace time T1 for monitoring cancellation of the transition by the sub CPU 280 passes, the sub CPU 280 transits to the energy-saving mode (step S406, which corresponds to step S115 and step S116) according to the request for transition to the energy-saving mode (step S405, which corresponds to step S113). If the return factor occurs (step S151), the energy-saving status transits to the normal mode (step S158) according to the request for returning from the energy-saving mode (step S407), the pattern filter is turned off at step S153, the packet type filter 235-3 is turned off at step S161, and the main CPU 101 enters the ready status (step S402). Until the power is off, the status transits between the ready status (step S402), the energy-saving standby status (step S404), and the energy-saving mode status (step S406) according to each request such as the request for energy saving (step S403), the request for canceling energy saving (step S408), the request for transition to energy saving (step S405), and the request for returning from energy saving (step S407). Thus, energy saving control is executed.

These processes are realized by a computer program. Program data is previously stored in the ROM, but it can be configured so as to be read and downloaded from a server connected to a network or from a known recording medium such as a compact disk (CD)-ROM, an SD card, and a magneto-optical disk each of which is loaded into a recording medium drive (not shown) if necessary or according to a request for version-up or the like.

According to one aspect of the present invention, predetermined data included in an IP packet transferred through a network is distinguished from each other, and transition from the energy-saving mode to the normal mode is performed. Therefore, an application for controlling energy saving is not required in the host side, which makes it possible to obtain further more effect of energy saving.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A network control device that sets a normal mode and an energy-saving mode in a system, the system including a controller that includes a main Central Processing Unit (CPU); and an interface controller that includes the network control device and a sub CPU, and is connected to a network, wherein both the controller and the interface controller operate in the normal mode, and power to the controller is shut down in the energy-saving mode, the network control device comprising:
a network filter configured to determine whether data included in the packet corresponds to predetermined data based on an attribute of the data when the system receives a packet transferred through the network; and
a control unit configured to enable and disable a function of the network filter, wherein the control unit
disables the function when the system is in the normal mode after the system is powered on,
enables the function when the system is in the energy-saving mode, and
disables the function when the system transits from the energy-saving mode to the normal mode,
wherein after leaving the normal mode, the system transits to an energy saving standby mode, and remains during a grace time in the energy saving standby mode, where the network filter remains active during the grace time to detect a signal requesting a return to the normal mode.

2. The network control device according to claim 1, wherein the packet is an Internet Protocol (IP) packet, and the attribute is set in the IP packet.

3. The network control device according to claim 2, wherein the IP packet includes a Transmission Control Protocol (TCP) header, and the attribute is set in the TCP header.

4. The network control device according to claim 3, wherein the attribute set in the TCP header is a TCP header flag.

5. The network control device according to claim 1, wherein the network filter is a packet type filter configured to determine whether the packet corresponds to a predetermined packet type.

6. The network control device according to claim 5, wherein when the packet is an Internet Protocol (IP) packet that includes a Transmission Control Protocol (TCP) header, the packet type filter is a Transmission Control Protocol (TCP) header filter that determines whether a flag in a TCP header of the packet corresponds to a predetermined flag.

7. The network control device according to claim 1, wherein the network filter is a pattern filter configured to determine whether a pattern in the packet corresponds to a predetermined pattern.

8. The network control device according to claim 1, wherein
the packet is an Internet Protocol (IP) packet that includes a Transmission Control Protocol (TCP) header, and
when the system is in the energy-saving mode, and the network filter determines that a flag in a TCP header of the packet corresponds to a synchronous idle (SYN) flag, the system transits from the energy-saving mode to the normal mode.

9. The network control device according to claim 8, wherein the system transits from the energy-saving mode to the normal mode when the sub CPU powers on the main CPU.

10. The network control device according to claim 1, wherein the control unit enables the function of the network filter before the main CPU completes preparation for transition to the energy-saving mode.

11. The network control device according to claim 7, wherein when the system transits from the energy-saving mode to the normal mode, the control unit disables the pattern filter immediately after the main CPU is powered on.

12. The network control device according to claim 1, wherein when the system transits from the energy-saving mode to the normal mode, the control unit disables the function of the TCP Header Filter after clock to the sub CPU is stopped.

13. The network control device according to claim 5, wherein the packet is an Internet Protocol (IP) packet.

14. The network control device according to claim 7, wherein the packet is an Internet Protocol (IP) packet.

15. The network control device according to claim 11, wherein the packet is an Internet Protocol (IP) packet.

16. The network control device according to claim 1, wherein
the controller includes a memory, a hard disk, and at least one of application functions for image processing, image output, and data communication, and the application functions shares the memory and the hard disk.

17. The network control device according to claim 1, wherein the function of the network filter is a packet type filter, and the control unit is configured to enable and disable the filter.

18. An image forming apparatus comprising:
an electronic system configured to be in a normal mode and an energy-saving mode; and
an imaging unit configured to form an image on a recording medium based on data inputted to the image forming apparatus, wherein
the electronic system includes
a controller that includes a main Central Processing Unit (CPU); and
an interface controller that includes a network control device configured to set the normal mode and the energy-saving mode in the electronic system, and a sub CPU, and is connected to a network, wherein both the controller and the interface controller operate in the normal mode, and power to the controller is shut down in the energy-saving mode; and
the network control device includes
a network filter configured to determine whether data included in the packet corresponds to predetermined data based on an attribute of the data when the system receives a packet transferred through the network; and
a control unit configured to enable and disable a function of the network filter, wherein the control unit
disables the function when the system is in the normal mode after the system is powered on,
enables the function when the system is in the energy-saving mode, and
disables the function when the system transits from the energy-saving mode to the normal mode,
wherein after leaving the normal mode, the system transits to an energy saving standby mode, and remains during a grace time in the energy saving standby mode, where the network filter remains active during the grace time to detect a signal requesting a return to the normal mode.

19. An image forming system comprising:
an image forming apparatus that includes
an electronic system configured to be in a normal mode and an energy saving mode; and
an imaging unit configured to form an image on a recording medium based on data inputted to the image forming apparatus; and
a plurality of client computers, wherein
the image forming apparatus and the client computers are connected through a network, and the image forming apparatus operates according to an instruction from one of the client computers so as to form an image,
the electronic system includes
a controller that includes a main Central Processing Unit (CPU); and
an interface controller that includes a network control device configured to set the normal mode and the energy-saving mode in the electronic system and a sub CPU, and is connected to a network, wherein both the controller and the interface controller operate in the normal mode, and power to the controller is shut down in the energy-saving mode; and
the network control device includes
a network filter configured to determine whether data included in the packet corresponds to predetermined data based on an attribute of the data when the system receives a packet transferred through the network; and
a control unit configured to enable and disable a function of the network filter, wherein the control unit
disables the function when the system is in the normal mode after the system is powered on,
enables the function when the system is in the energy-saving mode, and
disables the function when the system transits from the energy-saving mode to the normal mode,
wherein after leaving the normal mode, the system transits to an energy saving standby mode, and remains during a grace time in the energy saving standby mode, where the network filter remains active during the grace time to detect a signal requesting a return to the normal mode.

20. A network control method of setting a normal mode and an energy-saving mode in a system, the system including
a controller that includes a main Central Processing Unit (CPU); and an interface controller that includes the network control device and a sub CPU, and is connected to a network, wherein both the controller and the interface controller operate in the normal mode, and power to the controller is shut down in the energy-saving mode, the network control method comprising:

disabling a function for determination when the system is in the normal mode;

enabling the function when the system transits from the normal mode to the energy-saving mode, enabling another function during a grace time when the system transits from the normal mode to the energy-saving mode, where the network filter remains active during the grace time to detect a signal requesting a return to the normal mode, wherein when the system receives a packet transferred through the network, it is determined in the determination whether data included in the packet corresponds to predetermined data based on an attribute of the data.

21. The network control method according to claim 20, further comprising:

enabling the function before the system transits from the normal mode to the energy-saving mode; and determining whether the system transits from the normal mode transitions to the energy-saving mode.

22. The network control method according to claim 21, further comprising:

keeping the function disabled after the system is powered up till the determining is performed.

23. The network control method according to claim 20, wherein the packet is an Internet Protocol (IP) packet.

24. A recording medium that stores a computer program for executing a network control method of setting a normal mode and an energy-saving mode in a system, the system including a controller that includes a main Central Processing Unit (CPU); and an interface controller that includes the network control device and a sub CPU, and is connected to a network, wherein both the controller and the interface controller operate in the normal mode, and power to the controller is shut down in the energy-saving mode, the computer program causing a computer to execute:

disabling a function for determination when the system is in the normal mode;

enabling the function when the system transits from the normal mode to the energy-saving mode; and enabling another function during a grace time when the system transits from the normal mode to the energy-saving mode, where the network filter remains active during the grace time to detect a signal requesting a return to the normal mode, wherein when the system receives a packet transferred through the network, it is determined in the determination whether data included in the packet corresponds to predetermined data based on an attribute of the data.

* * * * *